United States Patent
Prosad et al.

(10) Patent No.: US 12,052,205 B2
(45) Date of Patent: Jul. 30, 2024

(54) METHOD AND ELECTRONIC DEVICE FOR PROVIDING PERSONALIZED RESPONSE SUGGESTIONS TO NOTIFICATION EVENT

(71) Applicant: SAMSUNG ELECTRONICS CO., LTD., Suwon-si (KR)

(72) Inventors: Sourav Prosad, Bengaluru (IN); Kaushik Das, Bengaluru (IN); Prabhat Mishra, Bengaluru (IN); Amogha D Shanbhag, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/940,804

(22) Filed: Sep. 8, 2022

(65) Prior Publication Data

US 2023/0084120 A1 Mar. 16, 2023

Related U.S. Application Data

(63) Continuation of application No. PCT/KR2022/008061, filed on Jun. 8, 2022.

(30) Foreign Application Priority Data

Sep. 15, 2021 (IN) .............................. 202141041504

(51) Int. Cl.
*G06F 15/16* (2006.01)
*G01S 13/04* (2006.01)
(Continued)

(52) U.S. Cl.
CPC .............. *H04L 51/02* (2013.01); *G01S 13/04* (2013.01); *G06F 3/011* (2013.01); *G06N 3/08* (2013.01)

(58) Field of Classification Search
CPC ....... H04L 51/02; H04L 51/04; H04L 51/043; G01S 13/04; G01S 13/06; G06F 3/011;
(Continued)

(56) References Cited

U.S. PATENT DOCUMENTS

| 8,810,388 B2 | 8/2014 | Jacobs et al. |
| 10,387,461 B2 | 8/2019 | Sharifi et al. |

(Continued)

FOREIGN PATENT DOCUMENTS

| WO | 2015/094288 A1 | 6/2015 |
| WO | 2020/146476 A1 | 7/2020 |

OTHER PUBLICATIONS

Communication dated Oct. 4, 2022, issued by the International Searching Authority in counterpart International Application No. PCT/KR2022/008061 (PCT/ISA/210 and PCT/ISA/237).

(Continued)

*Primary Examiner* — Kaylee J Huang
(74) *Attorney, Agent, or Firm* — Sughrue Mion, PLLC

(57) ABSTRACT

Embodiments herein provide a method for providing personalized response suggestions to a user for a notification event using an electronic device. The method includes detecting the notification event associated with a user. The method includes authenticating presence of the user for the notification event based on Ultra-Wide Band (UWB) signal data obtained from the electronic device and/or one or more IoT devices. The method includes determining current activity of the user based on the UWB signal data in response to a successful authentication. The method includes correlating the current activity with a plurality of activities performed by the user in past, and a past interaction pattern of the user in connection with events substantially similar to nature of (Continued)

the notification event. The method includes generating one or more auto response suggestions for the notification event as a result of correlation.

19 Claims, 28 Drawing Sheets

(51) Int. Cl.
  *G06F 3/01* (2006.01)
  *G06N 3/08* (2023.01)
  *H04L 51/02* (2022.01)
(58) Field of Classification Search
  CPC .......... G06N 3/08; G06N 3/0895; G06N 3/09; G06N 3/091; G06N 3/092; G06N 3/094; G06N 3/096; G06N 3/098; G06N 3/0985
  USPC .......................................... 709/206, 204, 207
  See application file for complete search history.

(56) References Cited

U.S. PATENT DOCUMENTS

| | | | | |
|---|---|---|---|---|
| 10,673,970 | B2* | 6/2020 | Dotan-Cohen | H04L 67/55 |
| 10,855,833 | B2 | 12/2020 | Santamaria et al. | |
| 11,004,567 | B2 | 5/2021 | Eckert et al. | |
| 11,721,440 | B1* | 8/2023 | Shan | G16H 40/67 |
| | | | | 705/2 |
| 2003/0210770 | A1* | 11/2003 | Krejcarek | H04M 1/715 |
| | | | | 379/88.01 |
| 2008/0242231 | A1* | 10/2008 | Gray | H04L 67/04 |
| | | | | 455/66.1 |
| 2009/0054091 | A1* | 2/2009 | van Wijk | H04L 67/54 |
| | | | | 455/466 |
| 2009/0227882 | A1* | 9/2009 | Foo | A61B 5/7207 |
| | | | | 343/893 |
| 2013/0132987 | A1* | 5/2013 | Narasimhan | G06Q 30/0207 |
| | | | | 725/14 |
| 2014/0206321 | A1* | 7/2014 | Mohapatra | H04L 51/02 |
| | | | | 455/466 |
| 2015/0019342 | A1 | 1/2015 | Gupta | |
| 2016/0142542 | A1 | 5/2016 | Li et al. | |
| 2017/0316320 | A1 | 11/2017 | Jamjoom et al. | |
| 2018/0146089 | A1* | 5/2018 | Rauenbuehler | H04M 1/72469 |
| 2018/0213088 | A1 | 7/2018 | Choe et al. | |
| 2018/0286400 | A1* | 10/2018 | Seo | G10L 15/1815 |
| 2019/0182196 | A1* | 6/2019 | Avital | H04L 51/42 |
| 2020/0043497 | A1* | 2/2020 | Hahm | G06F 1/163 |
| 2020/0053096 | A1* | 2/2020 | Bendersky | G06F 21/32 |
| 2021/0037000 | A1* | 2/2021 | Attard | G06N 20/00 |
| 2021/0120124 | A1 | 4/2021 | Czarnecki et al. | |
| 2022/0295144 | A1* | 9/2022 | Zhang | G06F 3/011 |
| 2022/0329973 | A1* | 10/2022 | Karmanov | H04W 4/029 |

OTHER PUBLICATIONS

Communication issued Aug. 31, 2023 by the Intellectual Property Office of India in Indian Patent Application No. 202141041504.

* cited by examiner

Figure 12A
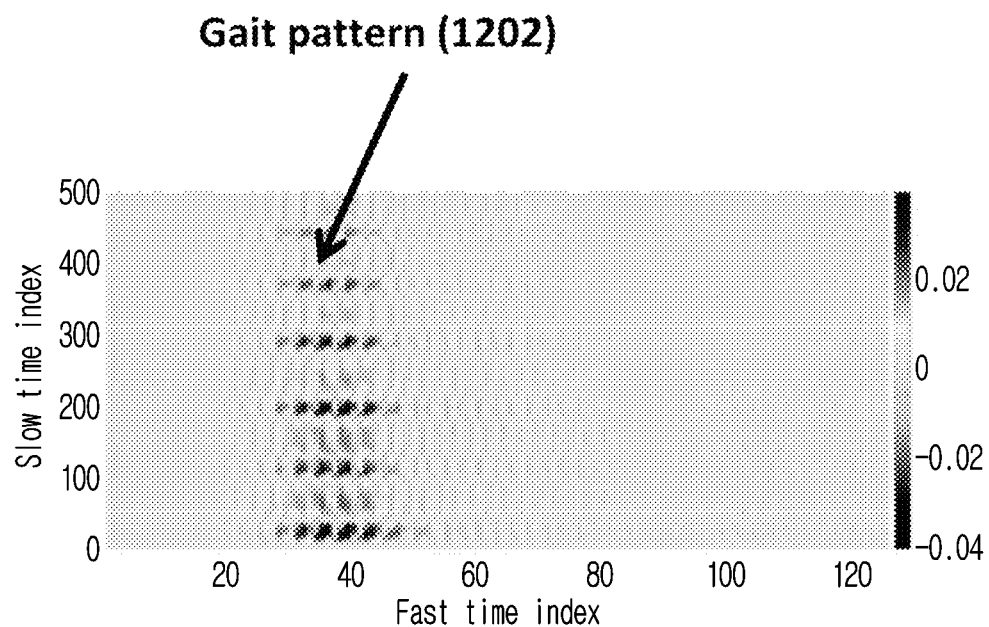
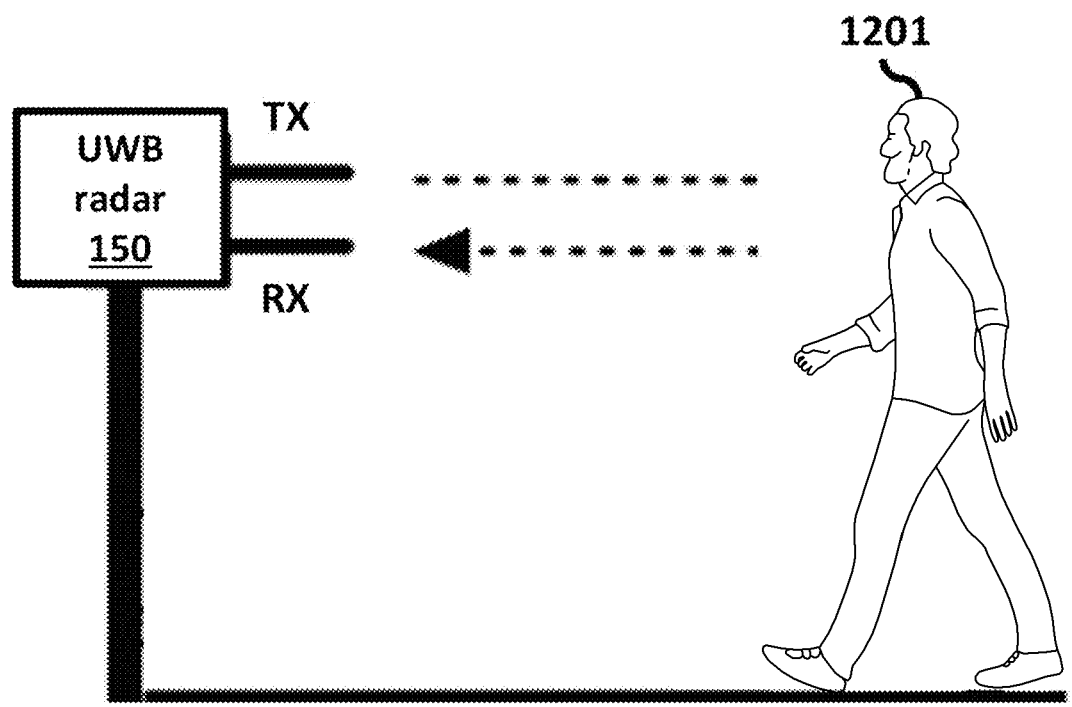

METHOD AND ELECTRONIC DEVICE FOR PROVIDING PERSONALIZED RESPONSE SUGGESTIONS TO NOTIFICATION EVENT

CROSS-REFERENCE TO RELATED APPLICATION(S)

This application is a bypass continuation of International Application No. PCT/KR2022/008061, filed on Jun. 8, 2022, which is based on and claims priority to Indian Patent Application No. 2021/41041504, filed in Sep. 15, 2021, in the Indian Intellectual Property Office, the disclosures of which are incorporated by reference herein in their entireties.

BACKGROUND

1. Field

The disclosure relates to electronic devices, and more specifically, to a method and an electronic device for providing personalized response suggestions to a notification event.

2. Description of the Prior Art

Automated response suggesting mechanism is very common in an related art electronic device such as a smartphone, a smart speaker, a wearable device. The automated response suggesting mechanism allows the related art electronic device to generate a response suggestion (e.g. snooze alarm) with an embedded action (e.g. snoozing the alarm) upon detecting a notification associated with a message, a call, alarm, etc at the electronic device. Further, the related art electronic device performs the action embedded with the response suggestion when a user chooses one response suggestion. However, the response suggestion is predefined and fixed for each kind of notification which may not be an actual response expected by the user. FIGS. 1A-1D illustrate examples of response suggestions in related art systems. For example, FIG. 1A, when a user wants to reject the call received at a smartphone (10), the smartphone (10) displays a fixed set of predefined text suggestions to the user. Here, a predefined text suggestion may be shown as a reason for rejecting the call or indicating a caller that the user will call later, etc.

However, as shown in FIG. 1B, the reason for rejecting the call may be wrong in the predefined text suggestions. Then the user chooses none of the predefined text suggestions. Further, the user manually types a text message with proper reason and sends the message to the caller, which significantly degrades a user experience and time consuming. FIG. 1C shows another example, in which, when the smartphone (10) receives an alarm notification, the smartphone (10) displays a snooze option to the user as the response suggestion to input a snooze time desired by the user to set. Further, the user manually enters the snooze time for suspending the alarm till the snooze time. The smartphone (10) is not intelligent to automatically find and set the snooze time desired by the user.

FIG. 1D shows an example, in which, during a chatting session, the smartphone (10) displays short replies as the response suggestions for the user based on a received message, where the short replies are meaningless and silly sometimes. A user identification is not used in the related art electronic device for providing the response suggestion and the notification. Hence, it is uncertain that the response suggestion is providing to an exact user to which the response suggestion and the notification has to deliver. Thus, it is desired to provide a useful alternative as a solution for the aforementioned problems.

SUMMARY

According to an aspect of the disclosure, there is provided a method and an electronic device for providing personalized response suggestions to a notification event. The electronic device authenticates a user based on a Ultra-Wide Band (UWB) signal reflected from the user to ensure that the notification and the personalized response are providing to an exact user to which the notification and the personalized has to deliver. Thus, the method ensures security of the notification and the personalized response and privacy of the user by authenticating the user.

According to another aspect of the disclosure, there is provided an instant automatic suggestion to the user by identifying whether the user is busy or available for noticing and responding to a notification upon detecting the notification event. In response to identifying that the user is busy, the electronic device intelligently mentions in the instant automatic suggestion about an availability of the user. Such an intelligence of the electronic device has a great role in enhancing a user experience.

According to an aspect of the disclosure, there is provided a method of providing personalized response suggestions to a notification event using an electronic device, the method including: detecting, by the electronic device, the notification event associated with a user, identifying, by the electronic device (100), a presence of the user for the notification event based on Ultra-Wide Band (UWB) signal data obtained from at least one of the electronic device or one or more Internet of Things (IoT) devices, determining, by the electronic device (100), current activity of the user based on the UWB signal data based on a successful identification of the presence of the user, correlating, by the electronic device, the current activity with a plurality of previous activities performed by the user, and a past interaction pattern of the user in connection with previous notification events and generating, by the electronic device (100), one or more auto response suggestions for the notification event based on a result of the correlation.

The identifying the presence of the user for the notification event based on the UWB signal data obtained from at least one of the electronic device or the one or more IoT devices, may include: receiving, by the electronic device, the UWB signal data from a UWB radar of at least one of the electronic device or the one or more IoT devices, determining, by the electronic device, one or more physical or physiological parameter of the user based on the UWB signal data, authenticating, by the electronic device, the user based on the one or more physical or physiological parameter using at least one Machine Learning (ML) model, determining, by the electronic device, a position of the user based on the UWB signal data using the at least one ML model, in response to successfully authenticating the user, identifying, by the electronic device, that the user is in proximity of the electronic device based on the position of the user and determining, by the electronic device, that the user is available for notifying the notification event.

The one or more physical or physiological parameter may include a breathing pattern, a heartbeat pattern, and a body cross section profile.

The determining the position of the user based on the UWB signal data using the at least one ML model, may include: determining, by the electronic device, UWB signal parameters including a Reflected Signal Strength (RSS), a Time difference of Arrival (TDOA), a Time of Arrival (TOA), and an Angle of Arrival (AOA) from the UWB signal data; and identifying, by the electronic device, the position of the user based on the UWB signal parameters using the at least one ML model.

The determining the current activity of the user based on the UWB signal data, may include: receiving, by the electronic device, an ambient sound around the electronic device, receiving, by the electronic device, IoT events from at least one of the electronic device or the one or more IoT devices, determining, by the electronic device, at least one of a posture or a movement of the user based on the UWB signal data and determining, by the electronic device, the current activity of the user based on at least one of the posture or the movement of the user, the ambient sound, and the IoT events using at least one ML model.

The ML model may be trained for identifying the user based on the one or more physical or physiological parameter by: providing, by the electronic device, a dataset of physical and physiological parameters of a plurality of users to the ML model, providing, by the electronic device, the one or more physical or physiological parameter of the user to the ML model, based on detecting the notification event associated with the user and training, by the electronic device, the ML model to identify the user by correlating the one or more physical or physiological parameter of the user with the dataset of physical and physiological parameters of the plurality of users.

The ML model may be trained for identifying the position of the user by: generating, by the electronic device, a first virtual map of an area using UWB signal data generated when no user is present in the area, providing, by the electronic device, the first virtual map of the area to the ML model, generating, by the electronic device, a second virtual map of the area using UWB signal data generated when at least one user is present in the area, providing, by the electronic device, the second virtual map of the area to the ML model and training, by the electronic device, the ML model to identify the position of the at least one user in the area by correlating the second virtual map with the first virtual map.

The ML model may be trained for determining the current activity of the user based on the posture and the movements of the user, the ambient sound, and the IoT events by: providing, by the electronic device, a dataset of a plurality of posture and movements of a human body corresponding to a plurality of activities, a plurality of ambient sounds, and a plurality of IoT events to the ML model and training, by the electronic device, the ML model to identify a specific activity corresponding to a particular posture and movement, among the posture and movements, a particular ambient sound, among the plurality of ambient sounds, and a particular IoT event, among the plurality of IoT events.

The electronic device may be one of a smartphone, a laptop, a tablet computer, a Personal Digital Assistance (PDA), a desktop computer, an Internet of Thing (IoT) device, or a wearable device.

The electronic device may be located in proximity of the user and is capable of providing the response suggestions for the notification event.

According to another aspect of the disclosure, there is provided an electronic device including: a memory storing one or more instructions; a processor configured to execute the one or more instructions to: detect a notification event associated with a user, identify a presence of the user for the notification event based on Ultra-Wide Band (UWB) signal data obtained from at least one of the electronic device or one or more Internet of Things (IoT) devices, determine current activity of the user based on the UWB signal data based on a successful identification of the presence of the user, determine an importance level of at least one of the current activity and a plurality of subsequent activities from an interaction history of the user, generate at least one personalized response to the notification event based on the importance of at least one of the current activity and the plurality of subsequent activities, and provide the at least one personalized response to the user.

The processor may be further configured to identify the presence of the user by: receiving the UWB signal data from a UWB radar of at least one of the electronic device or the one or more IoT devices, determining one or more physical or physiological parameter based on the UWB signal data, authenticating the user based on the one or more physical or physiological parameter using at least one Machine Learning (ML) model, determining a position of the user based on the UWB signal data using the at least one ML model, based on successfully authenticating the user, identifying that the user is in proximity of the electronic device based on the position of the user and determining that the user is available for notifying the notification event.

The one or more physical or physiological parameter may include a breathing pattern, a heartbeat pattern, and a body cross section profile.

The processor may be further configured to determine the current activity of the user based on the UWB signal data by: receiving an ambient sound around the electronic device, receiving IoT events from at least one of the electronic device or the one or more IoT devices, determining at least one of a posture and a movement of the user based on the UWB signal data and determining the current activity of the user based on the at least one of the posture and the movement of the user, the ambient sound, and the IoT events using at least one ML model.

The processor may be further configured to determine the importance of at least one of the current activity and the plurality of subsequent activities from the interaction history of the user by: determining that the notification event is important to notify the user based on an interaction pattern of the user in the interaction history, searching for an activity being performed by the user as per a routine from a recent activity pattern of the user in the interaction history at a time of detecting the notification event, identifying the activity being performed by the user as per the routine from the recent activity pattern at the time of detecting the notification event, determining that the identified activity and the determined current activity of the user are same and determining the importance of at least one of the identified activity and the plurality of subsequent activities listed in the recent activity pattern.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments, and the embodiments herein include all such modifications.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 12A and 12B illustrate a method of determining a unique gait pattern and a heartbeat pattern of the user using the electronic device, according to an example embodiment as disclosed herein;

DETAILED DESCRIPTION

Figure 1A:
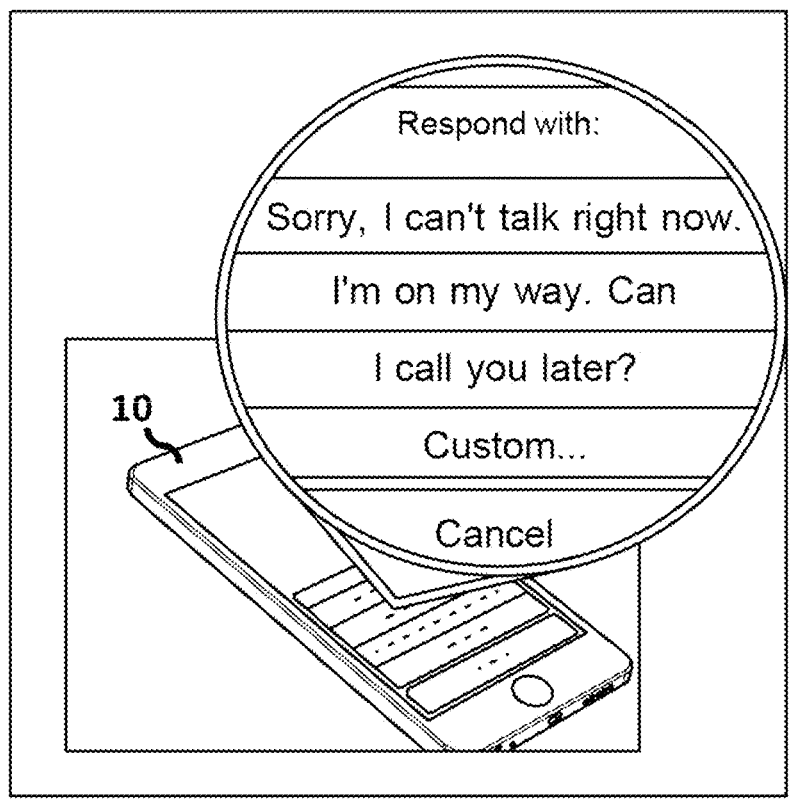
FIGS. 1A-1D illustrate response suggestions generating by related art electronic devices to a notification event.
Figure 1B:
Figure 1C:
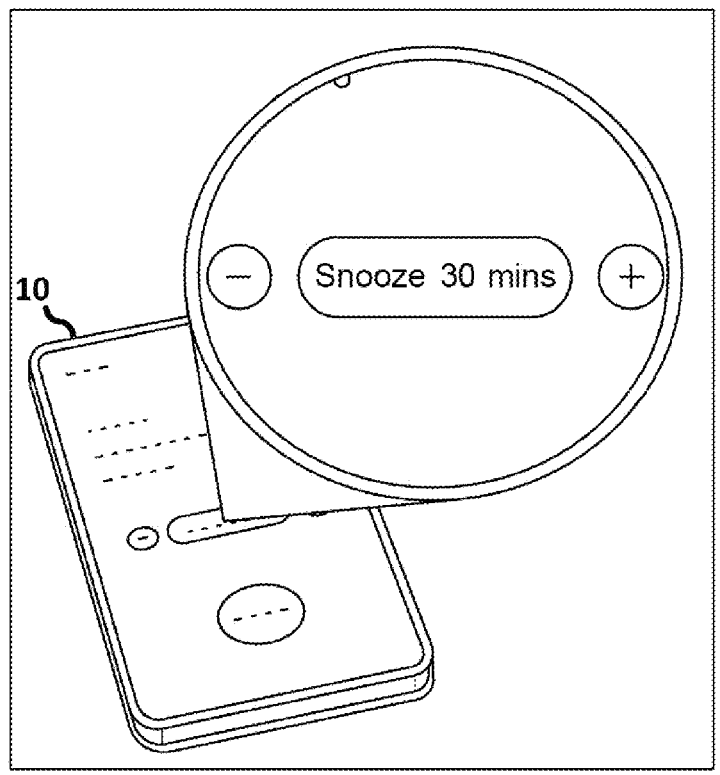
Figure 1D:
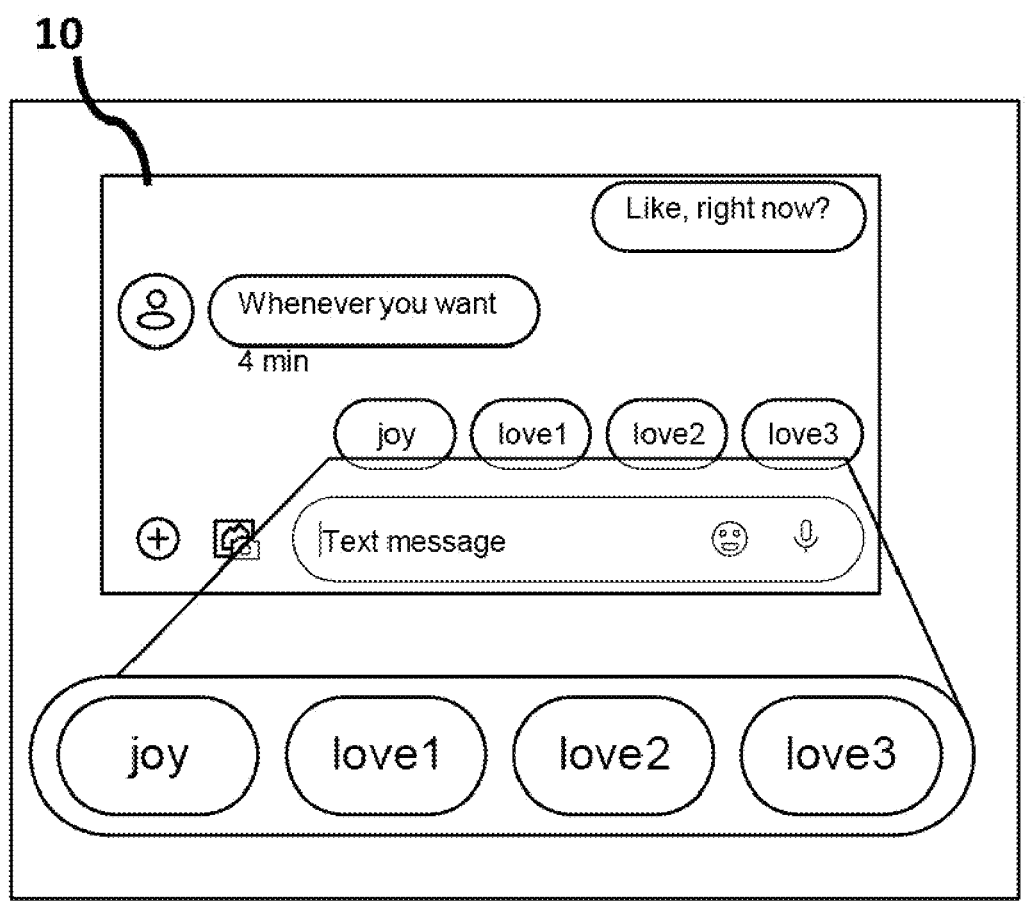

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein provide a method for providing personalized response suggestions to a notification event using an electronic device. The method includes detecting, by the electronic device, the notification event associated with a user. The method includes authenticating, by the electronic device, presence of the user for the notification event based on UWB signal data obtained from the electronic device and/or one or more Internet of Things (IoT) devices. The method includes determining, by the electronic device, current activity of the user based on the UWB signal data in response to a successful authentication. The method includes determining, by the electronic device, importance/priority of the current activity and/or the subsequent activities from an interaction history of the user. The method includes generating, by the electronic device, a personalized response to the notification event based on the importance of the current activity and/or the subsequent activities. The method includes providing, by the electronic device, the personalized response to the user.

Accordingly, the embodiments herein provide the electronic device for providing the personalized response suggestions to the notification event. The electronic device includes a personalized response suggesting engine, a memory, a processor, and the display where the personalized response suggesting engine is coupled to the memory and the processor. The personalized response suggesting engine is configured for detecting the notification event associated with the user. The personalized response suggesting engine is configured for authenticating the presence of the user for the notification event based on the UWB signal data obtained from the electronic device and/or the one or more IoT devices. The personalized response suggesting engine is configured for determining the current activity of the user based on the UWB signal data in response to the successful authentication. The personalized response suggesting engine is configured for determining the importance of the current activity and/or the subsequent activities from the interaction history of the user. The personalized response suggesting engine is configured for generating the personalized response to the notification event based on the importance of the current activity and/or the subsequent activities. The personalized response suggesting engine is configured for providing the personalized response to the user.

Accordingly, the embodiments herein provide a method for providing the personalized response suggestions to the notification event using the electronic device. The method includes detecting the notification event associated with the user. The method includes authenticating presence of the user for the notification event based on the UWB signal data obtained the electronic device and/or one or more IoT devices. The method includes determining, by the electronic device, the current activity of the user based on the UWB signal data in response to successful authentication. The method includes correlating, by the electronic device, the current activity with a plurality of activities performed by the user in past, and the past interaction pattern of the user in connection with events substantially similar to nature of the notification event. The method includes generating, by the electronic device, one or more auto response suggestions (i.e. personalized responses) for the notification event as a result of correlation.

Unlike related art methods and systems, the electronic device authenticates the user based on the UWB signal data to ensure that the notification and the personalized response are providing to an exact user to which the notification and the personalized has to deliver. Thus, the proposed method ensures security of the notification and the personalized response and privacy of the user by authenticating the user.

Unlike related art methods and systems, the electronic device provides an instant automatic suggestion to the user by identifying whether the user is busy or available for noticing and responding to a notification upon detecting the notification event. In response to identifying that the user is busy, the electronic device intelligently mentions in the instant automatic suggestion about an availability of the user. Such an intelligence of the electronic device has a great role in enhancing a user experience.

Referring now to the drawings, and more particularly to FIGS. 2A through 18, there are shown preferred embodiments.

Figure 2A:
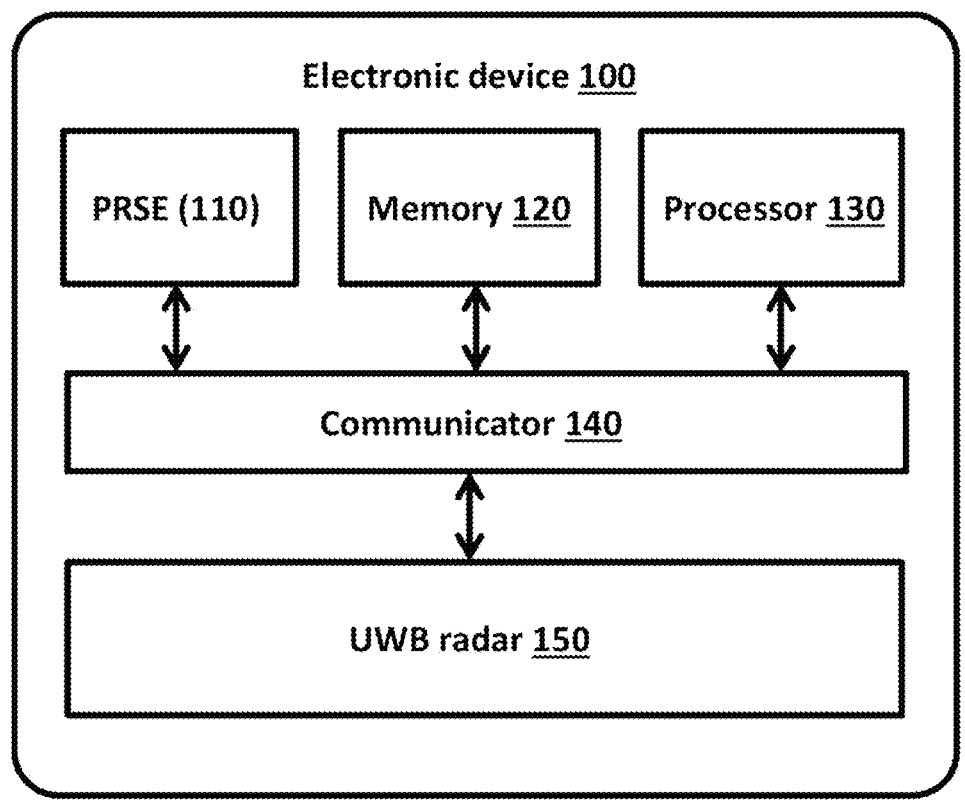
FIG. 2A is a block diagram of an electronic device for providing a personalized response suggestion to the notification event, according to an example embodiment as disclosed herein.

FIG. 2A is a block diagram of an electronic device (100) for providing a personalized response suggestion to the notification event, according to an example embodiment as disclosed herein. Examples of the electronic device (100) may include, but are not limited to a smartphone, a laptop, a tablet computer, a personal digital assistance (PDA), a desktop computer, an Internet of Thing (IoT) device (e.g. smart Television (TV), smart speaker, etc.), a wearable device (e.g. smart watch, smart band, etc.), etc. In an example embodiment, the electronic device (100) includes a Personalized Response Suggesting Engine (PRSE) (110), a memory (120), a processor (130), a communicator (140), an UWB radar (150). Additionally, the electronic device (100) may include a display and/or a speaker. In an example embodiment, the electronic device (100) is connected to other electronic devices an area (i.e. a space inside a building) to form a network such as an IoT network, where the electronic device (100) can communicate with the other electronic devices. The hardware architecture of the other electronic devices is the same as the hardware architecture of the electronic device (100).

The memory (120) stores UWB signal data, a first virtual map of an area, information of an activity (i.e. activity information) done by a user, an interaction history of the user, where the interaction history of the user includes an interaction pattern of the user and a recent activity pattern of the user. The interaction pattern of the user contains a history of all past interactions of the user with an entity (e.g. a relative, a friend, a mobile network operator, a colleague, etc.) related to the notification event. The recent activity pattern of the user contains details of all previously observed user activity patterns in per user basis. The user activity patterns include a start/end time range, a duration range, related device usage info, a related application (app) usage information. A virtual map (indoor map) of the area is a digital image of a map of the area. The memory (120) includes a correlation graph database (121) (shown in FIG. 10).

The memory (120) stores instructions to be executed by the processor (130). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information than its storage space. In certain examples, a non-transitory storage medium may store data that can, over time, change (e.g., in Random Access Memory (RAM) or cache). The memory (120) can be an internal storage unit or it can be an external storage unit of the electronic device (100), a cloud storage, or any other type of external storage.

The processor (130) is configured to execute instructions stored in the memory (120). The processor (130) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (130) may include multiple cores to execute the instructions. The communicator (140) is configured for communicating internally between hardware components in the electronic device (100). Further, the communicator (140) is configured to facilitate the communication between the electronic device (100) and other devices via one or more networks (e.g. Radio technology). The communicator (140) includes an electronic circuit specific to a standard that enables wired or wireless communication.

Figure 12B:
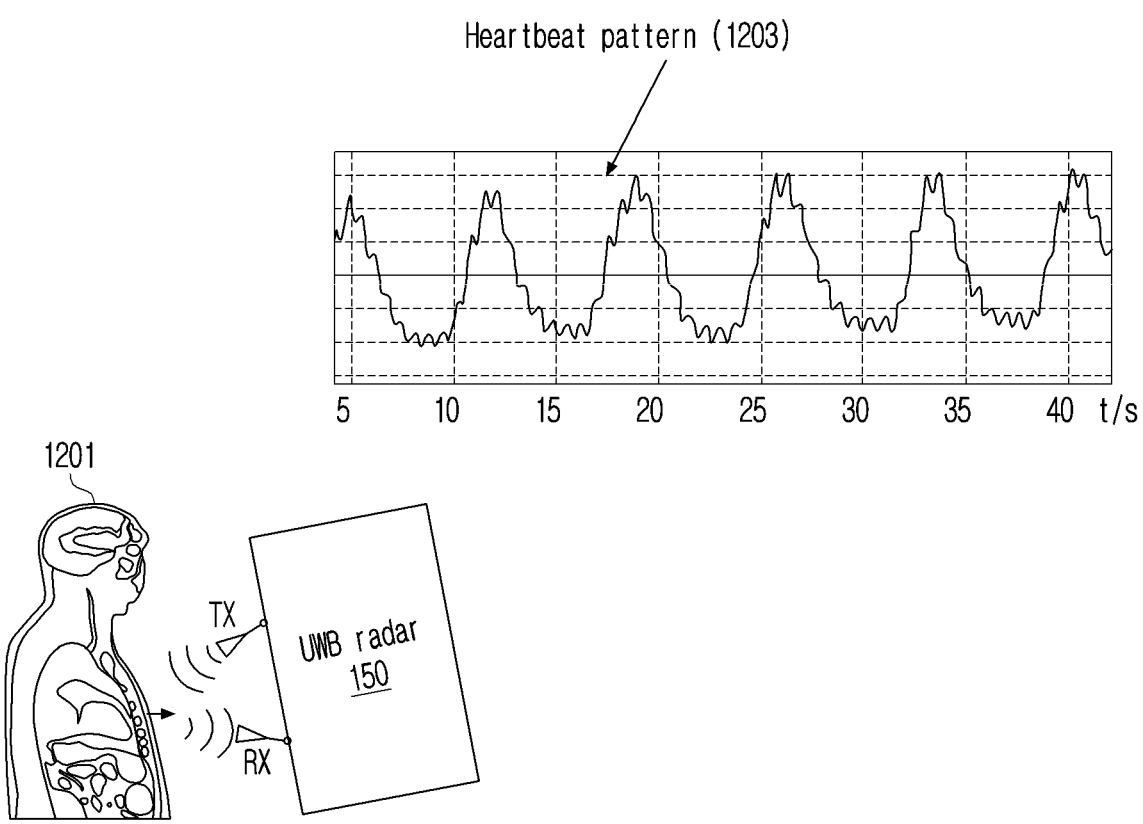

As shown in FIGS. 12A and 12B, the UWB radar (150) includes a transmitter (TX) and a receiver (RX). According to an example embodiment, the transmitter TX and/or the receiver RX may be a single Omni-directional antenna. The UWB radar (150) transmits a UWB signal towards an object using the transmitter (TX). According to an example embodiment, the object may be a human, a dog, a table, a wall/floor/ceiling of a room. However, the disclosure is not limited thereto, and as such, according to another example embodiment, the object may be any animate or inanimate object in the vicinity of the UWB radar. Further, the UWB radar (150) receives the UWB signal reflected from the object using the receiver (RX). Further, the UWB radar (150) generates UWB signal data using the received UWB signal (i.e. reflected UWB signal). In an example embodiment, the UWB signal data is the received UWB signal or signal data generated by comparing the reflected UWB signal and the transmitted UWB signal.

According to an example embodiment, the PRSE (110) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The PRSE (110) detects the notification event associated with the user. The notification event can be an external notification or an internal notification. The external notification is a notification received at the electronic device (100) such as a notification of an apps or a platform, an incoming call, an incoming messages, etc. The internal notification is a notification generated within the electronic device (100) such as a ringing alarm, a sensor event, a scheduled meeting notification, etc.

Figure 2B:
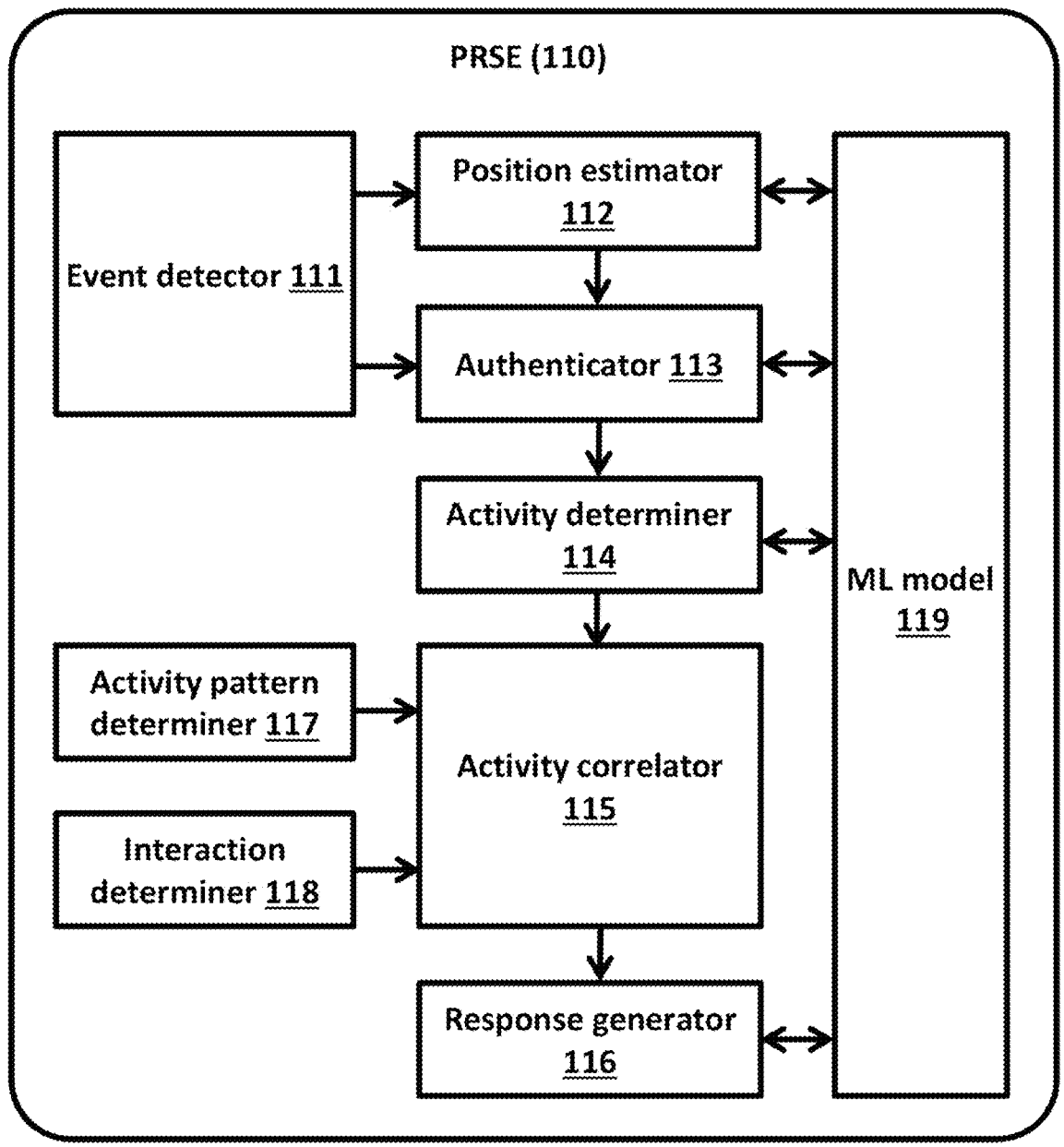
FIG. 2B is a block diagram of a personalized response suggesting engine for providing the personalized response to a user upon detecting the notification event, according to an example embodiment as disclosed herein.
Figure 4:
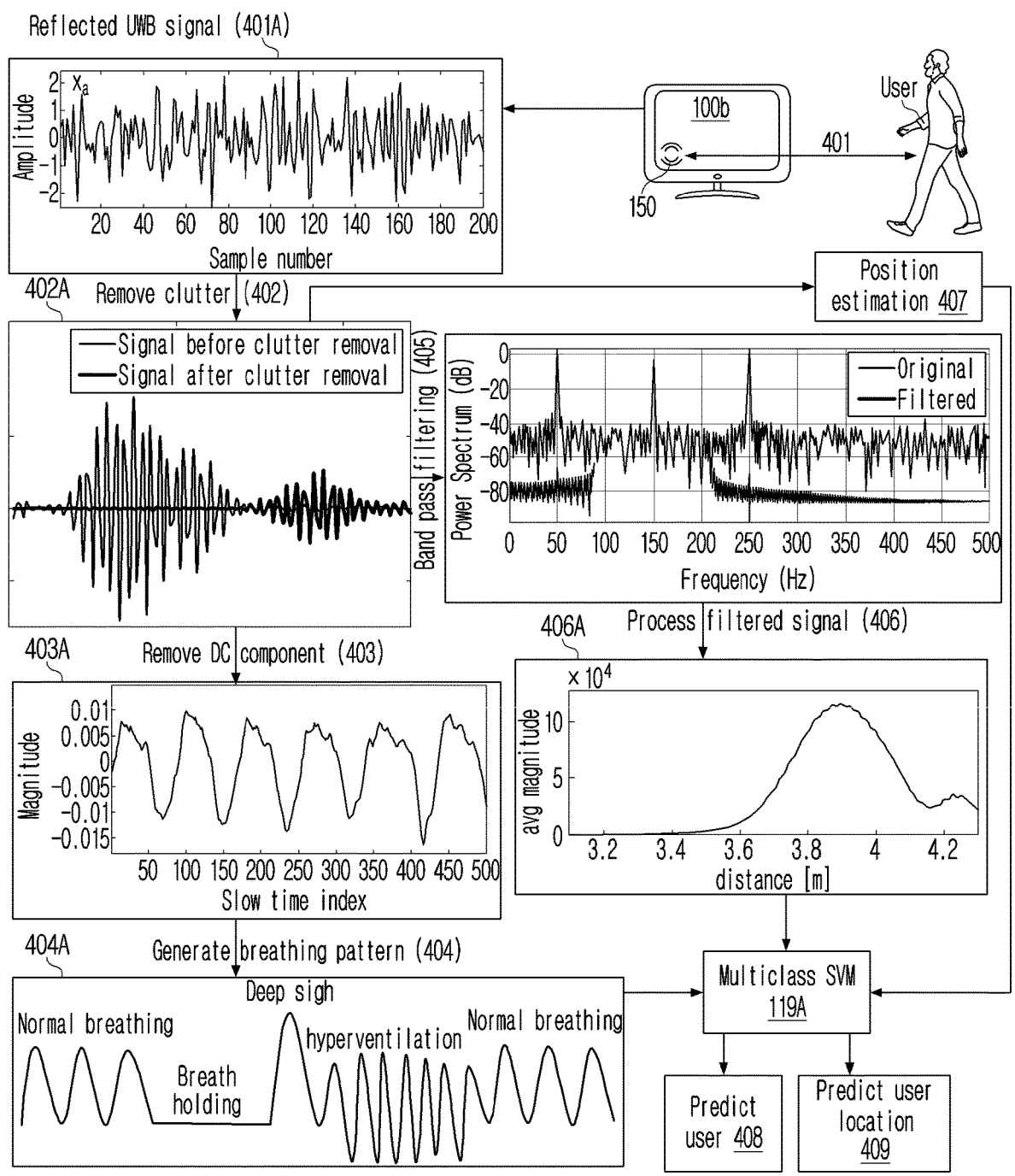
FIG. 4 is a flow diagram illustrating a method of authenticating the user for providing a notification and the personalized response suggestion by the electronic device upon detecting the notification event, according to an example embodiment as disclosed herein.
Figure 7:
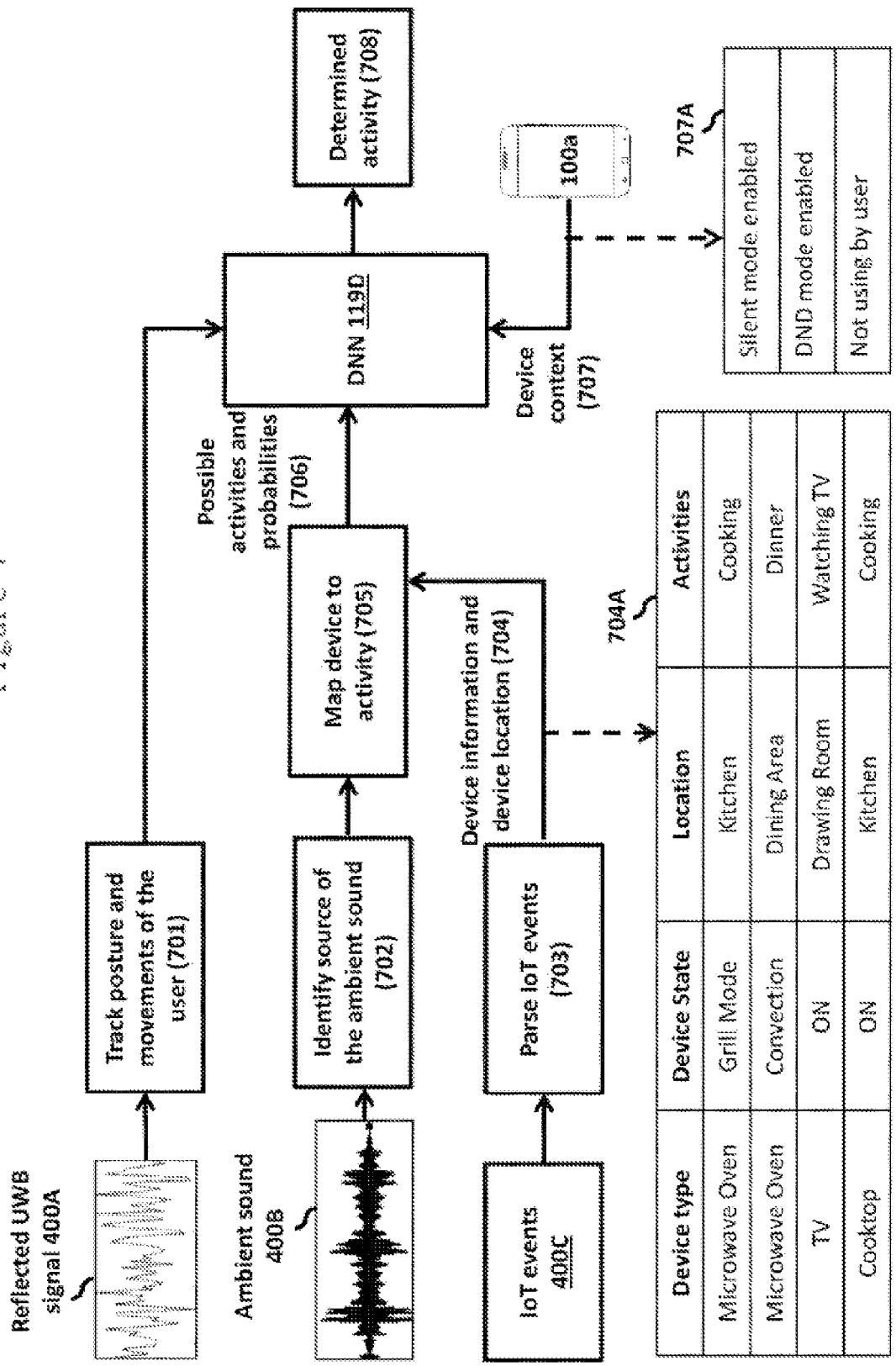
FIG. 7 is a flow diagram illustrating a method of determining the current activity of the user based on the UWB signal data, ambient sound signal, and IoT events by the electronic device, according to an example embodiment as disclosed herein.
Figure 11:
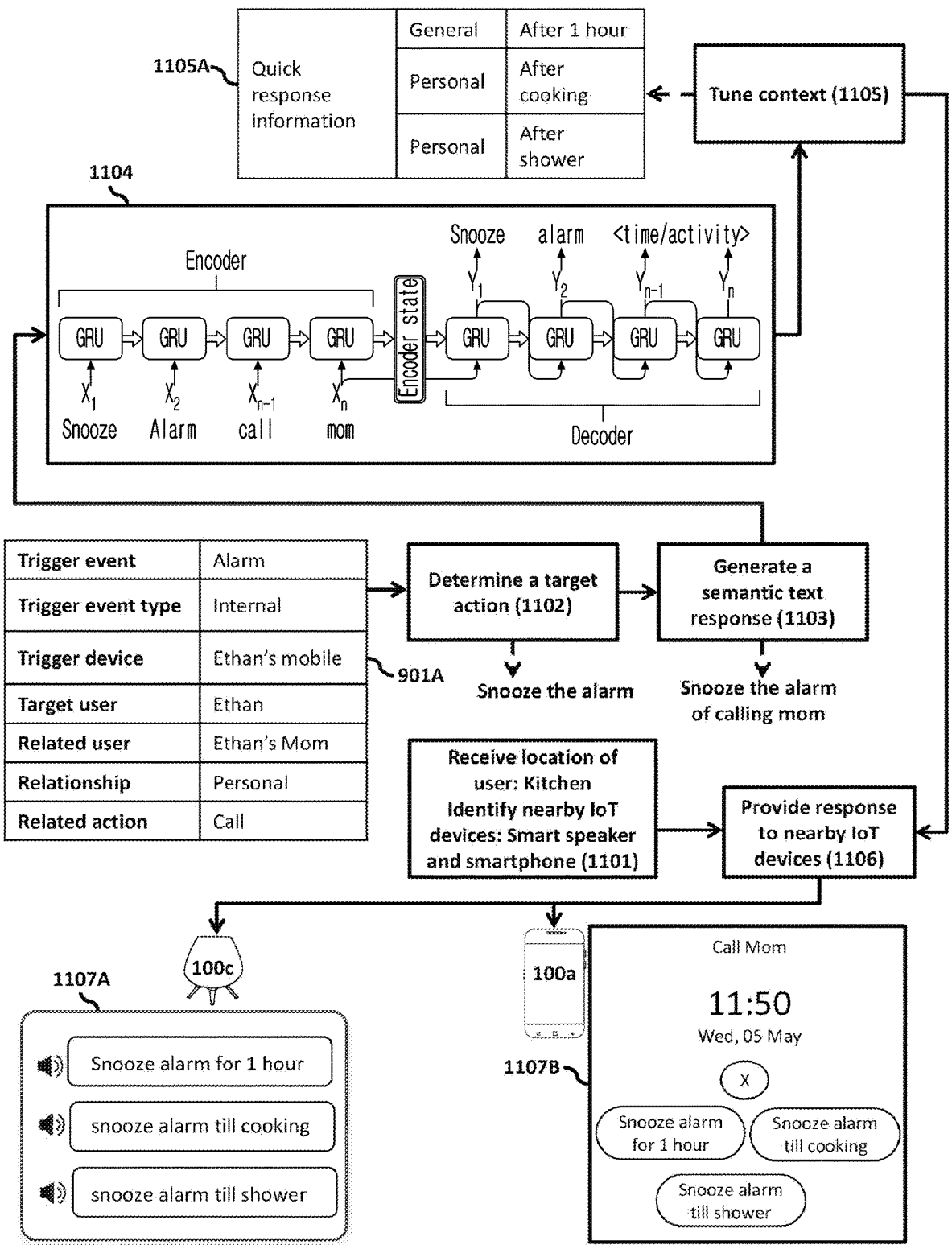
FIG. 11 is a flow diagram illustrating a method of generating and providing the personalized response suggestion to the user by the electronic device, according to an example embodiment as disclosed herein.
Figure 16A:
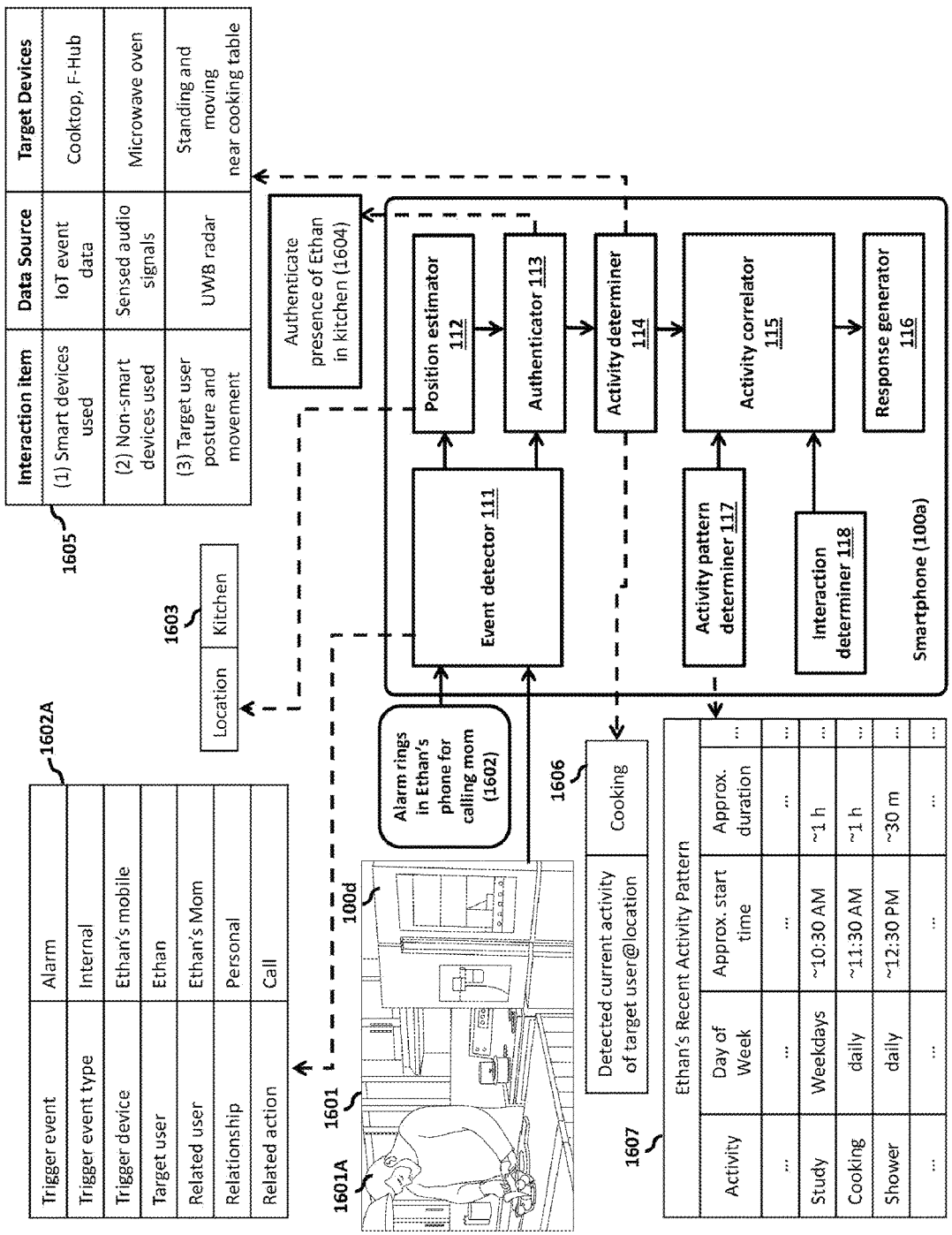
FIGS. 16A and 16B illustrate an example scenario of providing the personalized response suggestion to the user using a smartphone upon detecting an alarm event, according to an example embodiment as disclosed herein.

Further, the PRSE (110) authenticates presence of the user for the notification event based on UWB signal data obtained from the electronic device (100) and/or the one or more IoT devices. In an example embodiment, the PRSE (110) receives the UWB signal data from a UWB radar (150) of the electronic device (100) and/or the one or more IoT devices for authenticating the presence of the user. According to an example embodiment, the one or more IoT devices may include a smart phone (100a) as shown in FIG. 7, a smart TV (100b) as shown in FIG. 4, a smart speaker (100c) as shown in FIG. 11, and a smart refrigerator (100d) as shown in FIG. 16A. However, the disclosure is not limited thereto, and as such, various other devices may correspond to the one or more IoT devices. Further, the PRSE (110) determines an internal body parameter based on the UWB signal data. Examples of the internal body parameter include, but are not limited to a heartbeat pattern, a breathing pattern, a gait pattern, and a body cross section profile. According to another example embodiment, the PRSE (110) may determine an external physical characteristics of a user, such a height. The PRSE (110) authenticates the user based on the internal body parameter using a Machine Learning (ML) model (119) as shown in FIG. 2B. According to an example embodiment, the PRSE (110)=. a multiclass Support Vector Machine (SVM), and the ML model may be implemented by the SVM.

The PRSE (110) determines a position of the user based on the UWB signal data using the ML model (119), in response to successfully authenticating the user. According to an example embodiment, the ML model (119) may be include an Artificial Neural Network (ANN). In an example embodiment, the PRSE (110) determines UWB signal parameters includes a Reflected Signal Strength (RSS), a Time Difference of Arrival (TDOA), a Time of Arrival (TOA), and an Angle of Arrival (AOA) from the UWB signal data. Further, the PRSE (110) identifies the position of the user based on the UWB signal parameters using the ML model (119). Further, the PRSE (110) identifies that the user is in proximity of the electronic device (100) based on the position of the user, where the PRSE (110) has knowledge of position of the electronic device (100), the one or more IoT devices and one or more non-IoT devices (e.g. a mixer grinder) based on learning. The PRSE (110) confirms that the user is available for notifying the notification event in response to identifying that the user is in the proximity of the electronic device (100) while detecting the notification event.

The PRSE (110) determines current activity of the user based on the UWB signal data in response to a successful authentication. In an example embodiment, the electronic device (100) includes a microphone to capture the ambient sound. The PRSE (110) receives an ambient sound around the electronic device (100) using the microphone, where a source of the ambient sound may be the one or more non-IoT devices and/or the one or more IoT devices. Further, the PRSE (110) receives IoT events from the electronic device (100) and/or the one or more IoT devices. The PRSE (110) determines a posture and movements of the user based on the UWB signal data using the ML model (119). According to an example embodiment, the ML model (119) may include a Convolutional Neural Network (CNN). Further, the PRSE (110) determines the current activity of the user based on the posture and the movements of the user, the ambient sound, and the IoT events using the ML model (119) (e.g. Deep Neural Network (DNN)). According to an example embodiment, the ML model (119) may include a Deep Neural Network (DNN).

The PRSE (110) determines importance/priority of the current activity and/or subsequent activities from the interaction history of the user. In an example embodiment, the PRSE (110) determines that the notification event is important to notify the user based on the interaction pattern of the user in the interaction history. Further, the PRSE (110) searches for an activity being performed by the user as per a routine from a recent activity pattern of the user in the interaction history at a time of detecting the notification event. Further, the PRSE (110) identifies the activity being performed by the user as per the routine from the recent activity pattern at the time of detecting the notification event. Further, the PRSE (110) determines that the identified activity and the determined current activity of the user are the same. Further, the PRSE (110) determines the importance of the identified activity and/or the subsequent activities listed in the recent activity pattern.

In an example embodiment, the PRSE (110) determines a frequency of past interactions of the user with the entity related to the notification event from the interaction pattern. Further, the PRSE (110) identifies that the notification event is important to notify the user in response to determining that the frequency (e.g. 5 or more times in a day) of the past interactions of the user with the entity related to the notification event is high (e.g. 5 times in a day). The PRSE (110) identifies that the notification event is not important to notify the user if the frequency (e.g. 1 time in a day) of the past interactions of the user with the entity related to the notification event is medium. The PRSE (110) identifies that the notification event is not important to notify the user if the frequency (e.g. 1 time in a week) of the past interactions of the user with the entity related to the notification event is low.

The PRSE (110) generates a personalized response to the notification event based on the importance of the current activity and/or the subsequent activities. In an example embodiment, the PRSE (110) correlates the recent activity pattern, the interaction pattern of the user in the interaction history, and the current activity of the user. Further, the PRSE (110) generates the personalized response for the notification event based on the correlation. In an example embodiment, the recent activity pattern, the interaction pattern of the user in the interaction history, and the current activity of the user are correlated by generating a correlation graph of the recent activity pattern, the interaction pattern of the user in the interaction history, and the current activity of the user.

The PRSE (110) provides the personalized response to the user. In an example embodiment, the personalized response is provided to the user by displaying the personalized response on the display and/or uttering content the personalized response to the user using the speaker. In an example embodiment, an related art default response (e.g. snooze the alarm for "30" min) is also provided to the user along with the personalized response. Further, the user can select the personalized response or the related art default response. In response to selecting one response, the PRSE (110) performs an action (e.g. snooze the alarm for 30 minutes) according to the response.

In another example embodiment, the PRSE (110) correlates the current activity with the plurality of activities performed by the user in past, and the past interaction pattern of the user in connection with events substantially similar to nature of the notification event for generating one or more auto response suggestions for the notification event.

In an example embodiment, the ML model (119) is trained for authenticating the user based on an internal body parameter. The PRSE (110) provides a dataset of the internal body parameter of a plurality of user to the ML model (119). The PRSE (110) provides the internal body parameter of the user to the ML model (119), in response to detecting the notification event associated with the user. Further, the PRSE (110) trains the ML model (119) to authenticate the user by correlating the internal body parameter of the user with the dataset of internal body parameters of all the users.

In an example embodiment, the PRSE (110) recognizes the user activity based on the location of the target user in an indoor map, a posture of the target user, a degree of body part movements, breathing and/or heartbeat patterns, a stationary objects near to the target user, the IoT devices used, the non-smart devices used, a smartphone usage by the target user and a mobile state.

In an example embodiment, the ML model (119) is trained for identifying the position of the user. The PRSE (110) generates the first virtual map of the area using UWB signal data generated when none of users are present in the area. Further, the PRSE (110) provides the first virtual map of the area to the ML model (119). Further, the PRSE (110) generates a second virtual map of the area using UWB signal data generated when at least one user is present in the area. Further, the PRSE (110) provides the second virtual map of the area to the ML model (119). Further, the PRSE (110) trains the ML model (119) to identify the position of one or more users in the area by correlating the second virtual map with the first virtual map.

In an example embodiment, the ML model (119) is trained for determining the current activity of the user based on the posture and the movements of the user, the ambient sound, and the IoT events. The PRSE (110) provides a dataset of posture and movements of a human body, different ambient sounds, and different IoT events to the ML model (119). Further, the PRSE (110) trains the ML model (119) about a specific activity to be done by the user for a particular posture and movements of the human body, a particular ambient sound(s), and a particular IoT event(s).

The electronic device (100) is pre-trained using the UWB signal data capturing the posture, the body part movement, the internal body traits of many people, and the stationary object information when these body movements are done. Further, the electronic device (100) predicts the real-time activity against the trained model based on the real-time UWB signal data.

Although the FIG. 2A shows the hardware components of the electronic device (100) but it is to be understood that other embodiments are not limited thereon. In other example embodiments, the electronic device (100) may include less components or more components that those illustrated in FIG. 2A. Further, the labels or names of the components are used only for illustrative purpose and does not limit the scope of the invention. One or more components can be combined together to perform same or substantially similar function for providing the personalized response suggestion to the notification event.

FIG. 2B is a block diagram of the PRSE (110) for providing the personalized response to the user upon detecting the notification event, according to an example embodiment as disclosed herein. in an example embodiment, the PRSE (110) includes an event detector (111), a position estimator (112), an authenticator (113), an activity determiner (114), an activity correlator (115), a response generator (116), an activity pattern determiner (117), an interaction determiner (118), and a ML model (119).

The event detector (111), the position estimator (112), the authenticator (113), the activity determiner (114), the activity correlator (115), the response generator (116), the activity pattern determiner (117), the interaction determiner (118), and the ML model (119) are implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The event detector (111) detects the notification event associated with the user. The event detector (111) receives the UWB signal data from a UWB radar (150) of the electronic device (100) and/or the one or more IoT devices. The authenticator (113) authenticates the presence of the user for the notification event based on the UWB signal data obtained from the electronic device (100) and/or the one or more IoT devices. The authenticator (113) determines the internal body parameter based on the UWB signal data. Further, the authenticator (113) authenticates the user based on the internal body parameter using the ML model (119).

The position estimator (112) determines the position of the user based on the UWB signal data using the ML model (119), in response to successfully authenticating the user. In an example embodiment, the position estimator (112) determines the UWB signal parameters from the UWB signal data. Further, the position estimator (112) identifies the position of the user based on the UWB signal parameters using the ML model (119). Further, the position estimator (112) identifies that the user is in proximity of the electronic device (100) based on the position of the user, where the position estimator (112) has the knowledge of position of the electronic device (100), the one or more IoT devices and the one or more non-IoT devices based on the learning. The position estimator (112) confirms that the user is available for notifying the notification event in response to identifying that the user is in the proximity of the electronic device (100) while detecting the notification event.

The activity determiner (114) determines the current activity of the user based on the UWB signal data in response to the successful authentication. In an example embodiment, the activity determiner (114) receives the ambient sound around the electronic device (100) using the microphone. Further, the activity determiner (114) receives the IoT events from the electronic device (100) and/or the one or more IoT devices. The activity determiner (114) determines the posture and movements of the user based on the UWB signal data using the ML model (119). Further, the activity determiner (114) determines the current activity of the user based on the posture and the movements of the user, the ambient sound, and the IoT events using the ML model (119).

The activity correlator (115) determines the importance of the current activity and/or the subsequent activities from the interaction history of the user. In an example embodiment, the activity pattern determiner (117) determines that the notification event is important to notify the user based on the interaction pattern of the user in the interaction history. Further, the activity pattern determiner (117) searches for the activity being performed by the user as per the routine from the recent activity pattern of the user in the interaction history at the time of detecting the notification event. Further, the activity pattern determiner (117) identifies the activity being performed by the user as per the routine from the recent activity pattern at the time of detecting the notification event. Further, the activity correlator (115) determines that the identified activity and the determined current activity of the user are the same. Further, the activity correlator (115) determines the importance of the identified activity and/or the subsequent activities listed in the recent activity pattern.

In an example embodiment, the interaction determiner (118) determines the frequency of past interactions of the user with the entity related to the notification event from the interaction pattern. Further, the interaction determiner (118) identifies that the notification event is important to notify the user in response to determining that the frequency of the past interactions of the user with the entity related to the notification event is high (e.g. 5 times in a day). The interaction determiner (118) identifies that the notification event is not important to notify the user if the frequency of the past interactions of the user with the entity related to the notification event is medium or low.

The response generator (116) generates the personalized response to the notification event based on the importance of the current activity and/or the subsequent activities. In an example embodiment, the activity correlator (115) correlates the recent activity pattern, the interaction pattern of the user in the interaction history, and the current activity of the user. The activity correlator (115) provides personalized information to be embedded in the personalized response such as an activity finish duration, an activity name, next activity info, post activity device usage, etc. Further, the response generator (116) generates the personalized response for the notification event using the personalized information based on the correlation. The response generator (116) provides the personalized response to the user through various applicable modalities such as action response (e.g. snooze alarm) and text response (e.g. snooze till current activity ends) etc.

At least one of the plurality of modules may be implemented through the ML model (119). A function associated with the ML model (119) may be performed through the non-volatile memory, the volatile memory, and the processor (130).

The one or a plurality of processors control the processing of the input data in accordance with a predefined operating rule or ML model (119) stored in the non-volatile memory and the volatile memory. The predefined operating rule or artificial intelligence model is provided through training or learning.

Here, being provided through learning means that, by applying a learning technique to a plurality of learning data, a predefined operating rule or ML model (119) of a desired characteristic is made. The learning may be performed in a device itself in which the ML model (119) according to an example embodiment is performed, and/o may be implemented through a separate server/system.

The ML model (119) may include a plurality of neural network layers. Each layer has a plurality of weight values and performs a layer operation through calculation of a previous layer and an operation of a plurality of weights. Examples of neural networks include, but are not limited to, Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), Generative Adversarial Networks (GAN), and deep Q-networks.

The learning technique is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning.

Although the FIG. 2B shows the hardware components of the PRSE (110) but it is to be understood that other embodiments are not limited thereon. In other embodiments, the PRSE (110) may include less components or more components than those shown in FIG. 2B. Further, the labels or names of the components are used only for illustrative purpose and does not limit the scope of the invention. One or more components can be combined together to perform same or substantially similar function for providing the personalized response to the user upon detecting the notification event.

Figure 3:
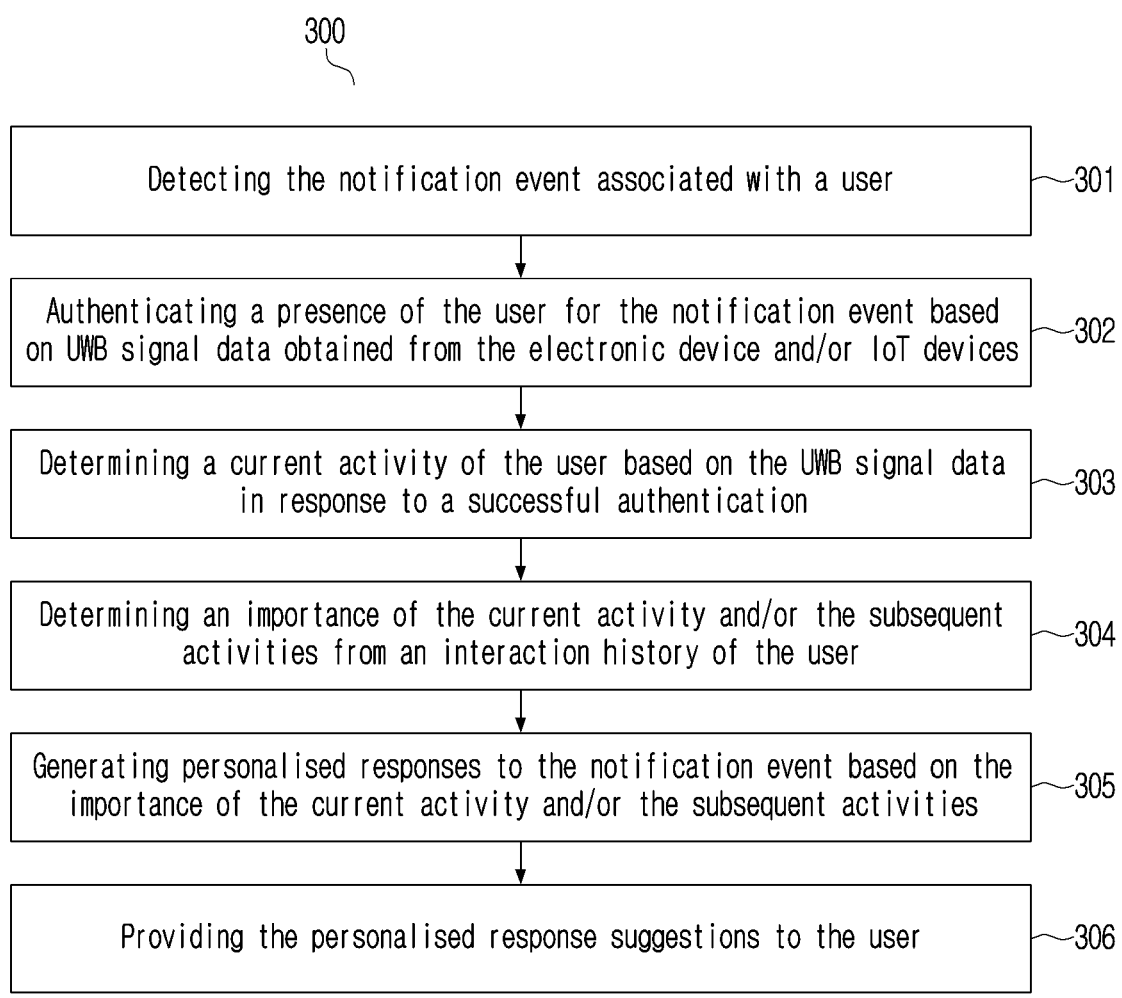
FIG. 3 is a flow diagram illustrating a method for providing the personalized response suggestion to the notification event by the electronic device, according to an example embodiment as disclosed herein.

FIG. 3 is a flow diagram 300 illustrating a method for providing the personalized response suggestion to the notification event by the electronic device (100), according to an example embodiment as disclosed herein. In an example embodiment, the method allows the PRSE (110) to perform operations (301-306) of the flow diagram 300. At operation 301, the method includes detecting the notification event associated with the user. At operation 302, the method includes authenticating the presence of the user for the notification event based on the UWB signal data obtained from the electronic device (100) and/or the one or more IoT devices. At operation 303, the method includes determining current activity of the user based on the UWB signal data in response to the successful authentication. At operation 304, the method includes determining the importance of the current activity and/or the subsequent activities from the interaction history of the user. At operation 305, the method includes generating the personalized response to the notification event based on the importance of the current activity and/or the subsequent activities. At operation 306, the method includes providing the personalized response to the user.

The various actions, acts, blocks, operations, or the like in the flow diagram 300 may be performed in the order presented, in a different order or simultaneously. Further, in some example embodiments, some of the actions, acts, blocks, operations, or the like may be omitted, added, modified, skipped, or the like without departing from the scope of the invention.

FIG. 4 is a flow diagram illustrating a method of authenticating the user for providing a notification and the personalized response suggestion by the electronic device (100) upon detecting the notification event, according to an example embodiment as disclosed herein. According to an example scenario, the user and a smart TV (100b) are located in a room. At 401, the smart TV (100b) receives the reflected UWB signal (400A) from different objects and the user present in the room using the UWB radar (150). At 402, the event detector (111) removes clutter in the reflected UWB signal (400A) to form a signal (402A). At 403, the event detector (111) further removes a Direct Current (DC) component in the signal (402A) to form a signal (403A). At 404, the authenticator (113) generates an image of the breathing pattern of the user from the signal (404A) and passes this image to a multiclass SVM (119A) (i.e. the ML model (119)).

At 405, the event detector (111) performs bandpass filtering on the signal (402A) and generates the bandpass filtered signal (405A). At 406, the authenticator (113) processes the bandpass filtered signal (405A) to form a signal (406A) that contains information about the gait pattern of the user and passes this information to the multiclass SVM (119A). Similarly, the authenticator (113) can determine other internal parameters and pass that information to the multiclass SVM (119A). At 407, the position estimator (112) estimates a probable position of the user in the room and passes the probable position to the multiclass SVM (119A). The multiclass SVM (119A) is a pre-trained multi-class input CNN. The multiclass SVM (119A) generates a multi label output contains a label of each user (408), a probability of the labelled user to present in the room, a label of the room (409), and a probability of the labelled room where the user is present based on the internal parameter of the user and the probable position of the user.

The authentication of the user, determination of the target user location and the activity does not necessarily need the electronic device (100) to be near to the target user. Alternatively, the UWB radar (150) is embedded with the IoT devices that are near to the user can track the user. The UWB radar (150) can detect the user even if the user is not in a same room where the UWB radar (150) is placed. The UWB signal can penetrate walls and others obstacles and has long-range of ~50 meters. Also, if the electronic device (100) and user both are not present in the same room, the UWB radar (150) can detect and identify the electronic device (100) and the user separately and authenticate the target user for whom the personalized response is intended to. If the user is cooking in the kitchen and the UWB radar (150) is placed in the bedroom, the UWB radar (150) can penetrate walls and can identify different postures, breathing patterns, micro-movements of the user. The information will be fed into the pre-trained DNN (119D) to identify the activity of the user. Also, the information from different IoT devices in the location and the audio signals from the non-smart devices help in activity recognition.

Figure 5:
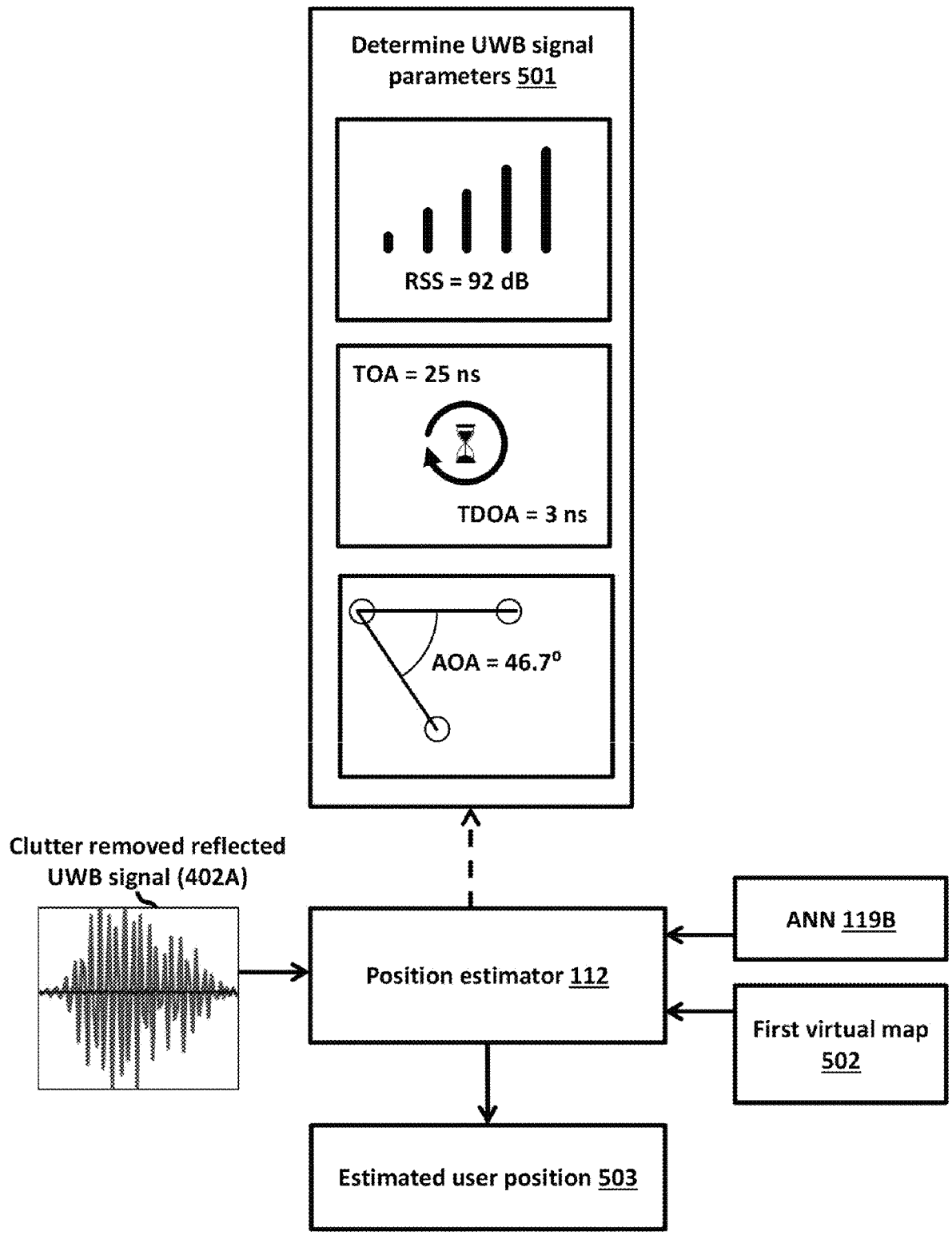
FIG. 5 is a flow diagram illustrating a method of determining a position of the user by the electronic device upon detecting the notification event, according to an example embodiment as disclosed herein.

FIG. 5 is a flow diagram illustrating a method of determining a position of the user by the electronic device (100) upon detecting the notification event, according to an example embodiment as disclosed herein. At 501, the position estimator (112) determines the UWB signal parameters such as the RSS (e.g. 92 decibels), the TOA (e.g. 25 nanoseconds), the TDOA (e.g. 3 nanoseconds), and the AOA (e.g. 46.7°) from the clutter removed reflected UWB signal (402A), in response to receiving the clutter removed reflected UWB signal (402A). At 502, the position estimator (112) fetches the first virtual map from the memory (120). At 503, the position estimator (112) estimates the user position in the first virtual map by applying the UWB signal parameters to the ML model (119), i.e. ANN (119B). In another example embodiment, the position estimator (112) generates the second virtual map of the room based on the UWB signal parameters, in response to fetching the first virtual map. Further, the position estimator (112) estimates the position of the one user in the room by correlating the second virtual map with the first virtual map using the ANN (119B).

Figure 6:
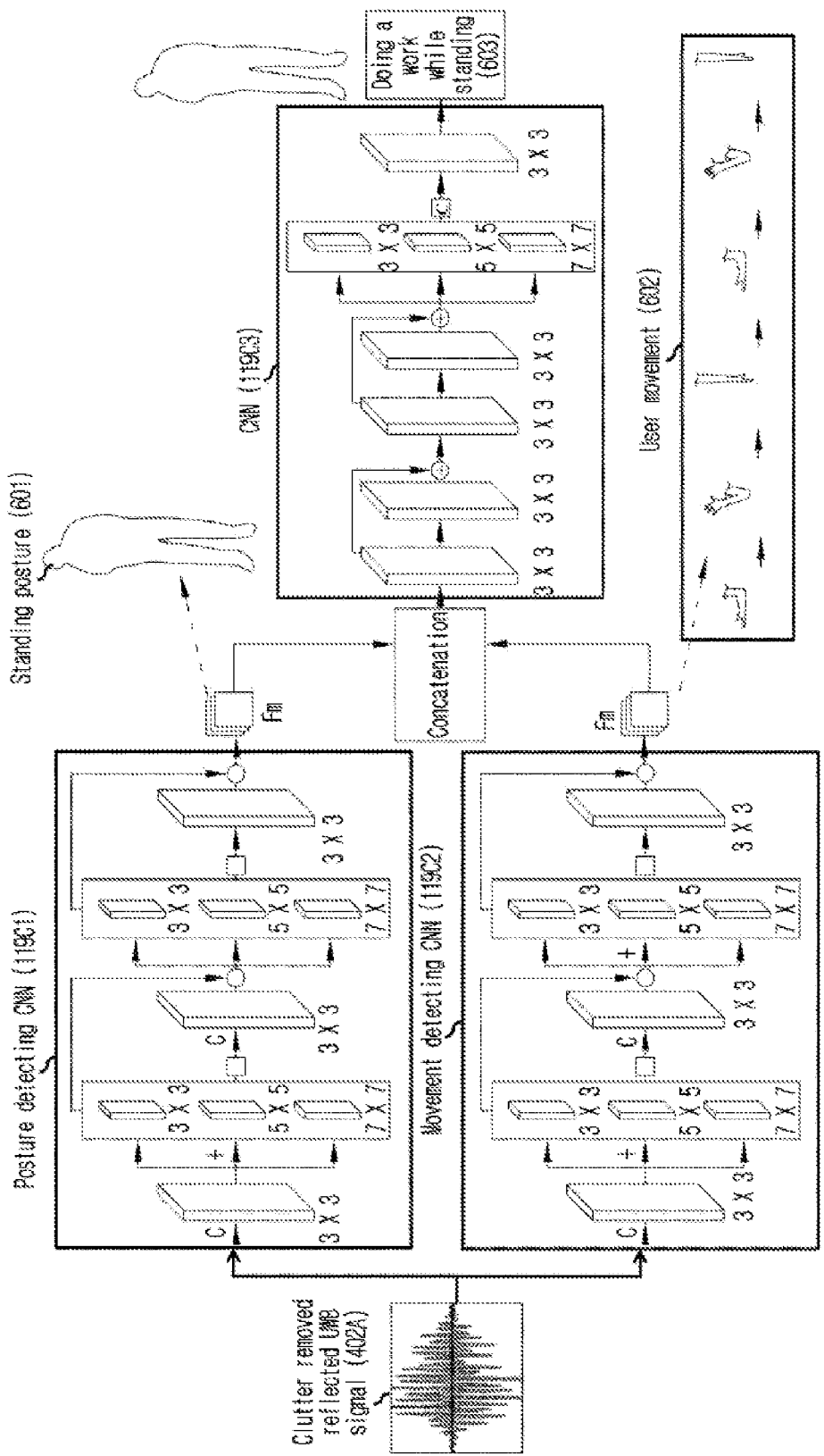
FIG. 6 is a flow diagram illustrating a method of predicting current activity of the user based on UWB signal data by the electronic device, according to an example embodiment as disclosed herein.

FIG. 6 is a flow diagram illustrating a method of predicting current activity of the user based on UWB signal data by the electronic device (100), according to an example embodiment as disclosed herein. At 601, in response to generating the clutter removed reflected UWB signal (402A) at the event detector (111), the activity determiner (114) determines the posture of the user from the clutter removed reflected UWB signal (402A) using the ML model (119), i.e. a posture detecting CNN (119C1). The CNN (119C1) is pre-trained on different postures and the clutter removed reflected UWB signals (402A) formed for the different postures.

At 602, the activity determiner (114) determines the movements of the user from the clutter removed reflected UWB signal (402A) using the ML model (119), i.e. a movement detecting CNN (119C2). The CNN (119C2) is pre-trained on different movements and the clutter removed reflected UWB signals (402A) formed for the different movements. The activity determiner (114) concatenates outputs of the posture detecting CNN (119C1) and the movement detecting CNN (119C2). At 603, the activity determiner (114) provides the concatenated output to the ML model (119), i.e. CNN (119C3) for predicting the current activity doing by the user in the determined posture. For example, the activity determiner (114) determines that the user is doing a work while standing. The CNN (119C3) is pre-trained for predicting the current activity doing by the user in the determined posture for various concatenated outputs.

FIG. 7 is a flow diagram illustrating a method of determining the current activity of the user based on the UWB signal data, ambient sound signal, and IoT events by the electronic device (100), according to an example embodiment as disclosed herein. At 701, the activity determiner (114) tracks the posture and movements of the user from the reflected UWB signal (400A) and provides this information to the ML model (119), i.e. DNN (119D). At 702, the activity determiner (114) identifies the source of the ambient sound (400B) by analyzing the ambient sound (400B), where the activity determiner (114) is pretrained with various ambient sound to identify a source of a particular ambient sound. The source of the ambient sound (400B) can be the IoT devices and the non-IoT devices. At 703, the activity determiner (114) parses the IoT events (400C) obtained from the one or more IoT devices or the electronic device (100) or an IoT cloud connected to the one or more IoT devices. At 704, the activity determiner (114) classifies device information (e.g. device type, device state, activities supporting by the device) and device location as shown in table (704A).

At 705, the activity determiner (114) maps the IoT devices and the non-IoT devices to the activities related to the IoT devices and the non-IoT devices. For example, let the non-IoT device is a mixer grinder and the IoT device is a microwave oven, then the activity related to the mixer grinder and the microwave oven is cooking. At 706, the activity determiner (114) provides such possible activities obtained based on the mapping with a probability of doing that activities by the user to the DNN (119D). At 707, the activity determiner (114) identifies a context of devices such as a smartphone, wireless headphone, a wearable device etc. that are personally used by the user. The context of the devices includes an operational state set by the user such as enabling silent mode, enabling Do Not Disturb (DND) mode, or a current usage of the device by the user, etc. Further, the activity determiner (114) provides the context of the devices to the DNN (119D). At 708, the activity determiner (114) identifies the current activity of the user based on an output from the DNN (119D). The DNN (119D) is a pre-trained with different activities and their probabilities of happening with different devices.

Figure 8:
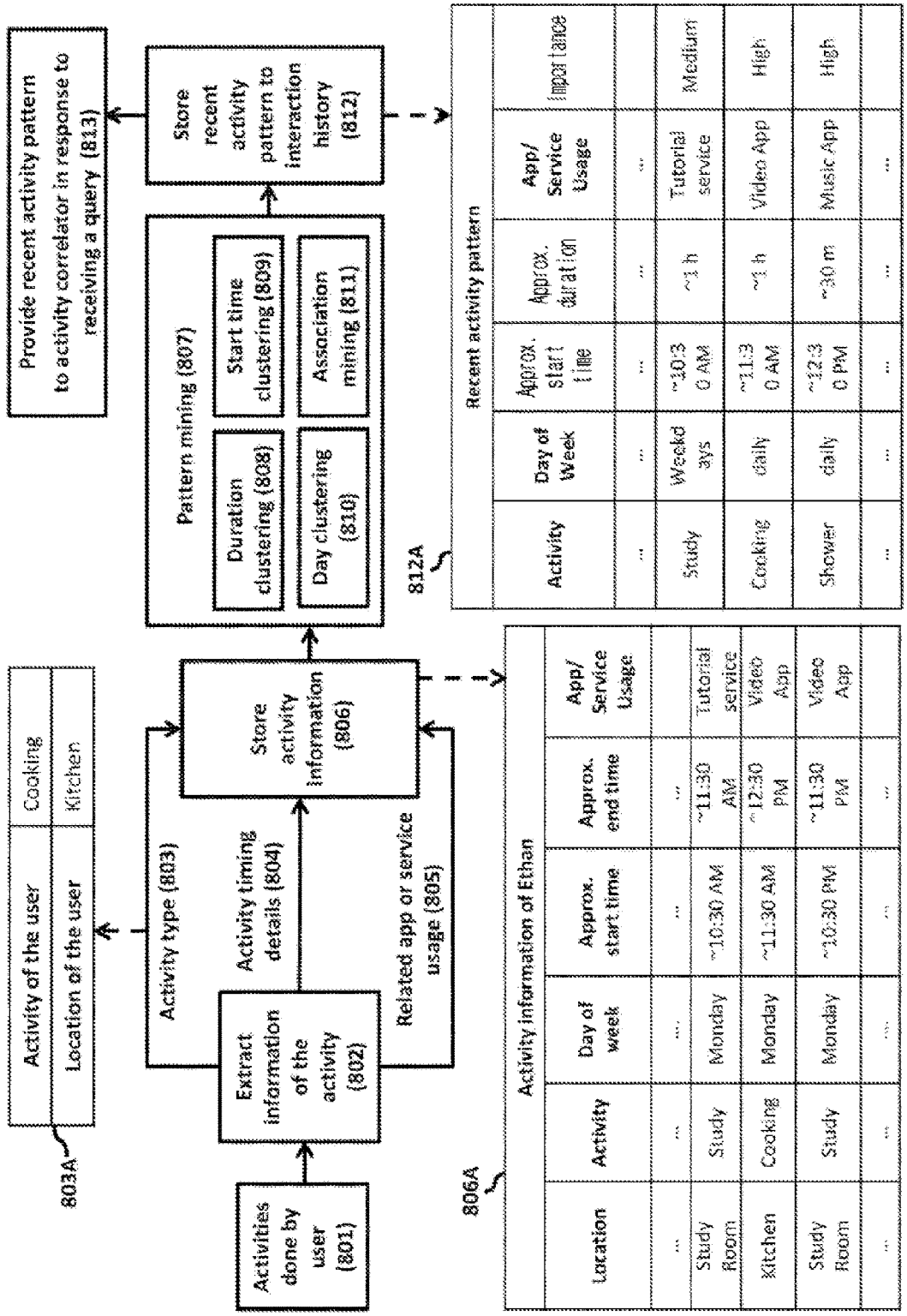
FIG. 8 is a flow diagram illustrating a method of determining a recent activity pattern of the user by the electronic device, according to an example embodiment as disclosed herein.

FIG. 8 is a flow diagram illustrating a method of determining the recent activity pattern of the user by the electronic device (100), according to an example embodiment as disclosed herein.

At 801, the activity pattern determiner (117) monitors the activities done by all users of the electronic device (100). At 802, the activity pattern determiner (117) extracts information of each activity done by each user (e.g. Ethan) includes an activity type (803), activity timing details (804), and app/service (e.g., application/service) usage (805). At 806, the activity pattern determiner (117) stores the activity information of each user (e.g. Ethan) (806A) into the memory (120). The activity type (803) includes a activity which the user done and a location where the activity is done as shown in table (803A). The activity timing details (804) include a day of a week at which the user has done the activity, and an approximate time at which the user started and stopped the activity.

The app/service usage (805) includes a name of the app or the service used by the user to perform the activity. At 807, the activity pattern determiner (117) performs pattern mining on the stored activity information of the user and clustering the activity information based on different classification such as a duration class, a start time class, a day class. At 808, the activity pattern determiner (117) clusters the activity information with same activity duration to the duration class. At 809, the activity pattern determiner (117) clusters the activity information with same start time to the start time class. At 810, the activity pattern determiner (117) clusters the activity information in which the activity is performed on same day to the day class. At 811, the activity pattern determiner (117) performs association mining and determines association between each class. In response to completing the pattern mining, the activity pattern determiner (117) generates the recent activity pattern using each class based on the association between each class.

The recent activity pattern includes the activity name, the day of the week at which the user done the activity, and the approximate time at which the user started the activity, the approximate duration of the activity, the name of the app or the service used by the user to perform the activity and importance of the activity. At 812, the activity pattern determiner (117) stores the recent activity pattern to the interaction history as shown in table (812A). At 813, the activity pattern determiner (117) provides the recent activity pattern to the activity correlator (115) in response to receiving a request from the activity correlator (115).

Figure 9:
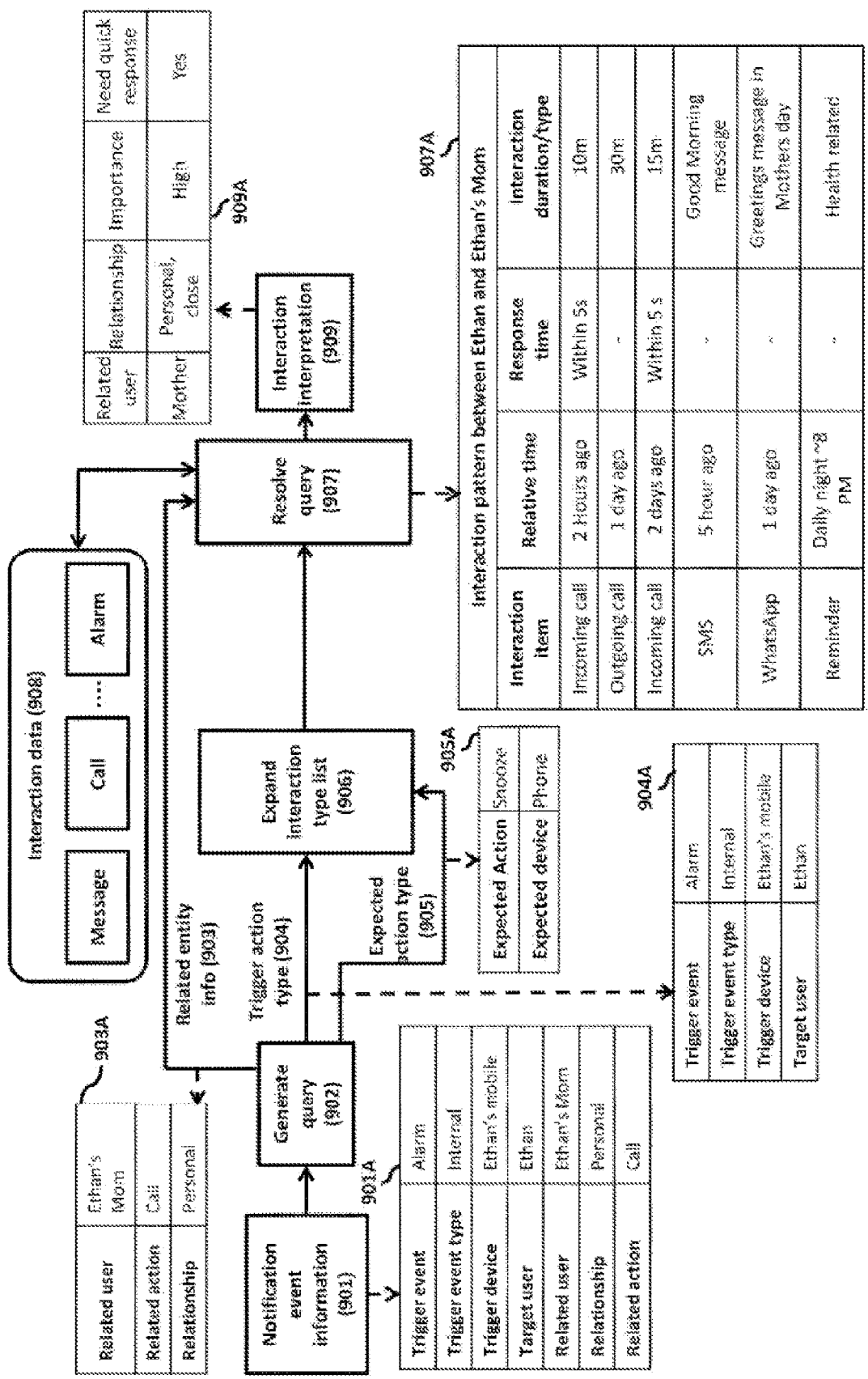
FIG. 9 is a flow diagram illustrating a method of determining an interaction pattern of the user by the electronic device, according to an example embodiment as disclosed herein.

FIG. 9 is a flow diagram illustrating a method of determining the interaction pattern of the user by the electronic device (100), according to an example embodiment as disclosed herein. At 901, the event detector (111) extracts information of the notification event, in response to detecting the event. As shown in table (901A) information of the notification event includes a name of the notification event (trigger event), a type of the notification event (trigger event type), the electronic device (100) that detects the notification event (trigger device), that user associated with the notification event (target user), the entity related to the notification event (related user), a relationship between the user and the entity (relationship), and an actioned that to be done by the user as per the information in the notification (related action).

At 902, the interaction determiner (118) generates a query for determining the interaction pattern between the user and the entity. At 906, the interaction determiner (118) expands an interaction type list using a trigger action type (904) and an expected action type (905) extracted from the information in the notification. As shown in table 905A, the expected action type (905) includes an expected action (e.g. snooze) and the expected device (e.g. smartphone). As shown in table 904A, the trigger action type (904) includes the trigger event, the trigger event type, the trigger device, and the target user. At 907, the interaction determiner (118) resolves the query using the information about the entity (903) extracted from the information in the notification, the expanded interaction type list and interaction data (908) of the user. As shown in table 903A, the information about the entity (903) includes the related user, the relationship, and the related action. The interaction data (908) is data of a past interaction of the user with the electronic device (100) and the one or more IoT devices. Examples of past interaction are sending/receiving message, initiating/attending a call, enabling/disabling the alarm, etc. The interaction determiner (118) determines the interaction pattern between the user and the entity in response to resolving the query.

As shown in table (907A), the interaction pattern between the user and the entity includes an interaction item, a relative time of each interaction item with respect to a time of detecting the notification event, a response time of the user to each interaction item, an interaction type/duration. The interaction determiner (118) analyses the interaction pattern between the user and the entity and makes an interpretation on the interaction based on the analysis. As shown in table (909A), the interpretation is whether the notification is important to the user based on the entity and the relationship with the entity, and the interaction determiner (118) determines that a quick response is required when the notification is important to the user.

Figure 10:
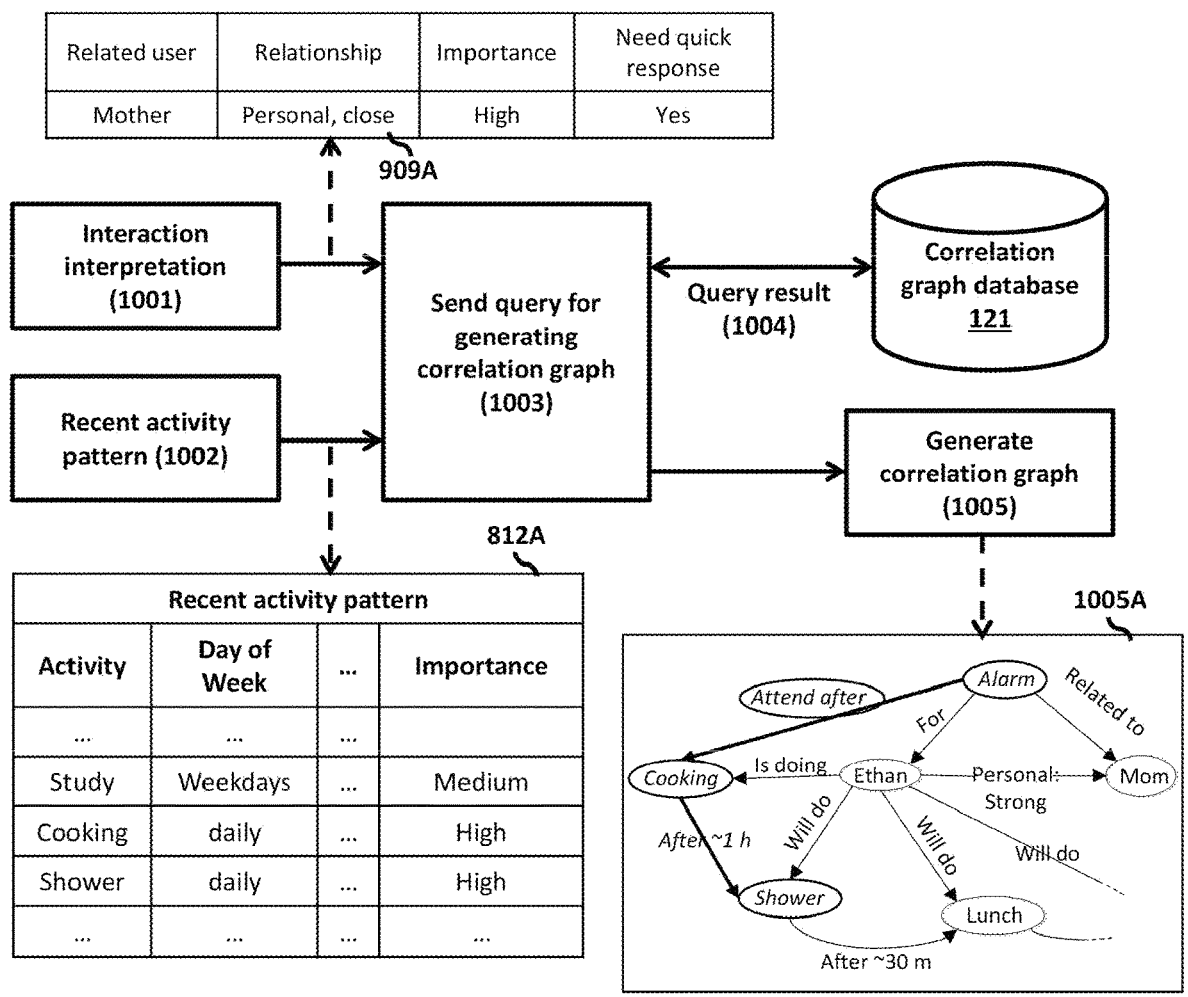
FIG. 10 is a flow diagram illustrating a method of correlating the recent activity pattern, the interaction pattern of the user, the current activity of the user by the electronic device for generating a correlation graph, according to an example embodiment as disclosed herein.

FIG. 10 is a flow diagram illustrating a method of correlating the recent activity pattern, the interaction pattern of the user, the current activity of the user by the electronic device (100) for generating a correlation graph, according to an example embodiment as disclosed herein. At 1001, the activity correlator (115) receives the interaction interpretation (909A) from the interaction determiner (118). At 1002, the activity correlator (115) receives the recent activity pattern (812A) from the activity pattern determiner (117). At 1003, the activity correlator (115) sends a query for generating the correlation graph to the correlation graph database (121). At 1004, the correlation graph database (121) provides a correlation graph template/rule to the activity correlator (115). At 1005, the activity correlator (115) generates the correlation graph (1005A) based on the recent activity pattern, the interaction pattern of the user, and the current activity of the user using the correlation graph template/rule. An example for the correlation graph template/rule is given below.

```
Graph{
Nodes = {
"alarm" : ["cooking", "user"],
"cooking" : ["shower"],
"user" : ["cooking", "toilet"],
....
}
Edges = {("alarm","cooking",
"attend after"),
("cooking","shower","after 1h").
("user","cooking", "is doing"),
....}
}
```

FIG. 11 is a flow diagram illustrating a method of generating and providing the personalized response suggestion to the user by the electronic device (100), according to an example embodiment as disclosed herein. The response generator (116) receives the correlation graph (1005A) from the activity correlator (115). At 1101, the response generator (116) receives position (e.g. kitchen) of the user in the area (e.g. home) from the position estimator (112), and identifies IoT devices (e.g. smart speaker (100c) and smartphone (100a)) located nearby to the user position, where the response generator (116) is pretrained with the position of each IoT device in the area. At 1102, the response generator (116) determines the target action (e.g. snooze the alarm) based on the information of the notification event (901A). At 1103, the response generator (116) generates a semantic text response based on the target action and the correlation graph (1005A). In an example, the generated semantic text response is "Snooze the alarm of calling mom". At 1104, the response generator (116) provides the semantic text response to an encoder-decoder unit (1104). An encoder and a decoder of the encoder-decoder unit (1104) are made of cascaded Gated Recurrent Units (GRUs), where an output of the encoder is provided as input of the decoder.

The response generator (116) provides words in the semantic text response give as input to GRUs of the encoder. In response to generating the output at the encoder, the decoder predicts at least one word in the semantic text response to be embedded as the response with a placeholder. At 1105, the response generator (116) tunes a context of the predicted output of the decoder for generating a quick response. As shown in table (1105A), information in the quick response includes general responses and more personalized responses. At 1106, the response generator (116) provides the quick response to the nearby IoT devices for delivering to the user. The quick response is delivered to the user based on a modality supporting by the nearby IoT devices (e.g. smart speaker (100c) and smartphone (100a)). For example, the smart speaker (100c) utters the content the quick response to the user at 1107A, whereas the smartphone (100a) displays the quick response to the user at 1107B.

The position estimator (112) identifies the position of the user in the home based on the indoor map. The response generator (116) sets proximity of radius and determines all the IoT devices that come under the radius. Out of those identified IoT devices, the response generator (116) finds out the IoT devices which can be used for providing response options based on device capabilities and attributes. For different scenarios, the response generator (116) determines a feasibility score between 0 and for the eligible IoT devices. If the score of the IoT device crosses a threshold (e.g. 0.7), then the response generator (116) pushes the response to that IoT device. For example, if a speaker volume of the smartphone is low, then an alarm sound will also be low. So the smartphone is less feasible for providing the response suggestions to the user. The speaker volume of the smart speaker is high. So, the smart speaker is highly feasible for sending providing the response suggestions to the user.

FIGS. 12A and 12B illustrate a method of determining a unique gait pattern and a heartbeat pattern of the user using the electronic device (100), according to an example embodiment as disclosed herein. The UWB radar (150) transmits the UWB signal towards the user (1201) using a single omni-directional antenna (TX) and the reflected UWB signal is received from the user by another single omni-directional antenna (RX). The electronic device (100) precisely tracks minute details like a person's body traits like walking pattern (gait), the heartbeat pattern, and the breathing pattern using various signal parameters of the reflected UWB signal like RSS, TDOA, TOA, AOA etc. These body traits are unique to a person and using these the electronic device (100) can easily identify the person. Images of the tracked gait pattern (1201) and the heartbeat pattern (1203) are shown in FIG. 12A and FIG. 12B respectively.

Figure 13A:
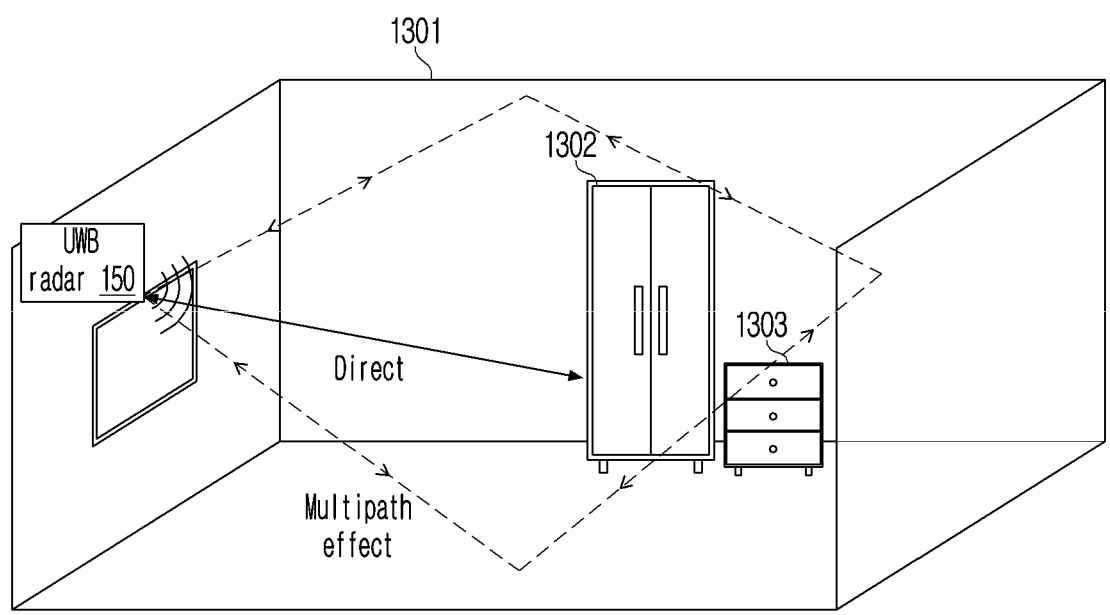
FIG. 13A illustrates a path of a reflected UWB signal in a location without the user, according to an example embodiment as disclosed herein.
Figure 13B:
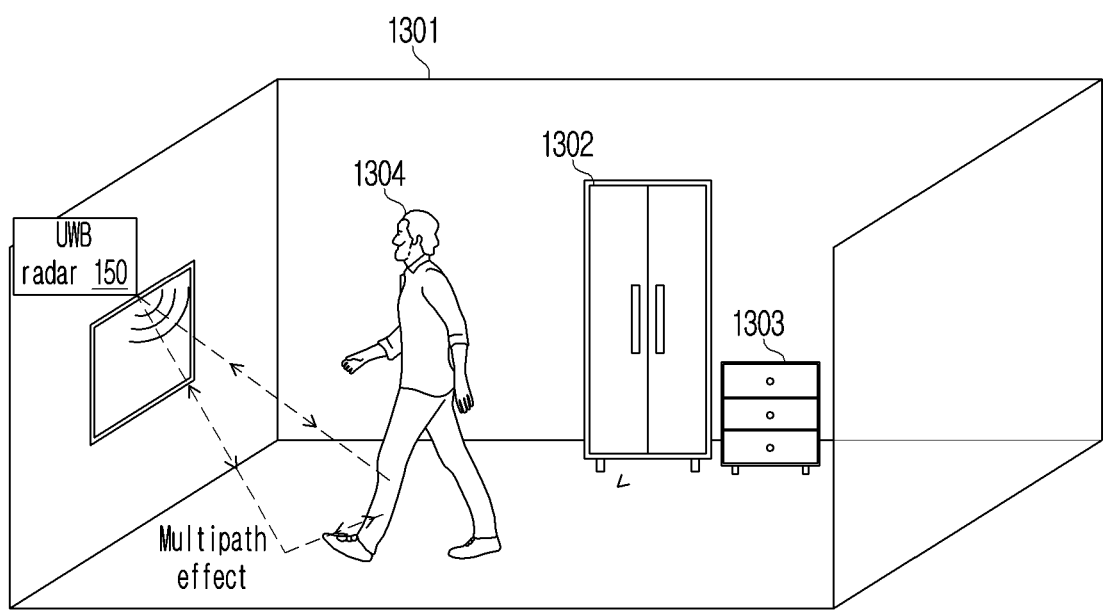
FIG. 13B illustrates a mutual interactions of the reflected UWB signal due to a person present in the location, according to an example embodiment as disclosed herein.

FIG. 13A illustrates a path of the reflected UWB signal in a location (1301) without the user. FIG. 13B illustrates a mutual interactions of the reflected UWB signal due to a person (1304) present in the location (1301). A UWB radar propagation geometry in an indoor environment can be used to precisely identify positions of various objects and people in the location (1301) (i.e. area) (e.g. room). The accuracy of the user authentication and the user position is further improved by training the electronic device (100). The electronic device (100) learns the body trait signatures for all the people present in the location (1301) based on the UWB signal data for about 30 days and create class labels for each person using the multi-class SVM (119A). During training, the electronic device (100) intelligently considers the UWB signal data only for the people who "permanently" reside in the location. Further, the electronic device (100) creates an indoor map (i.e. virtual map) using the UWB signal data along with information rooms and IoT devices in the rooms in the location. The indoor map is a precise map of the location indicating various stationary objects (1302, 1303)

along with precise positions of those. Once the training phase is over, the electronic device (100) authenticates the user (1304) in real-time with more than 95% accuracy by feeding the UWB data to the pre-trained multi-class SVM (119A). With the indoor map constructed during the training phase, the electronic device (100) precisely identifies the position of the user (1304) in real-time.

Figure 14:
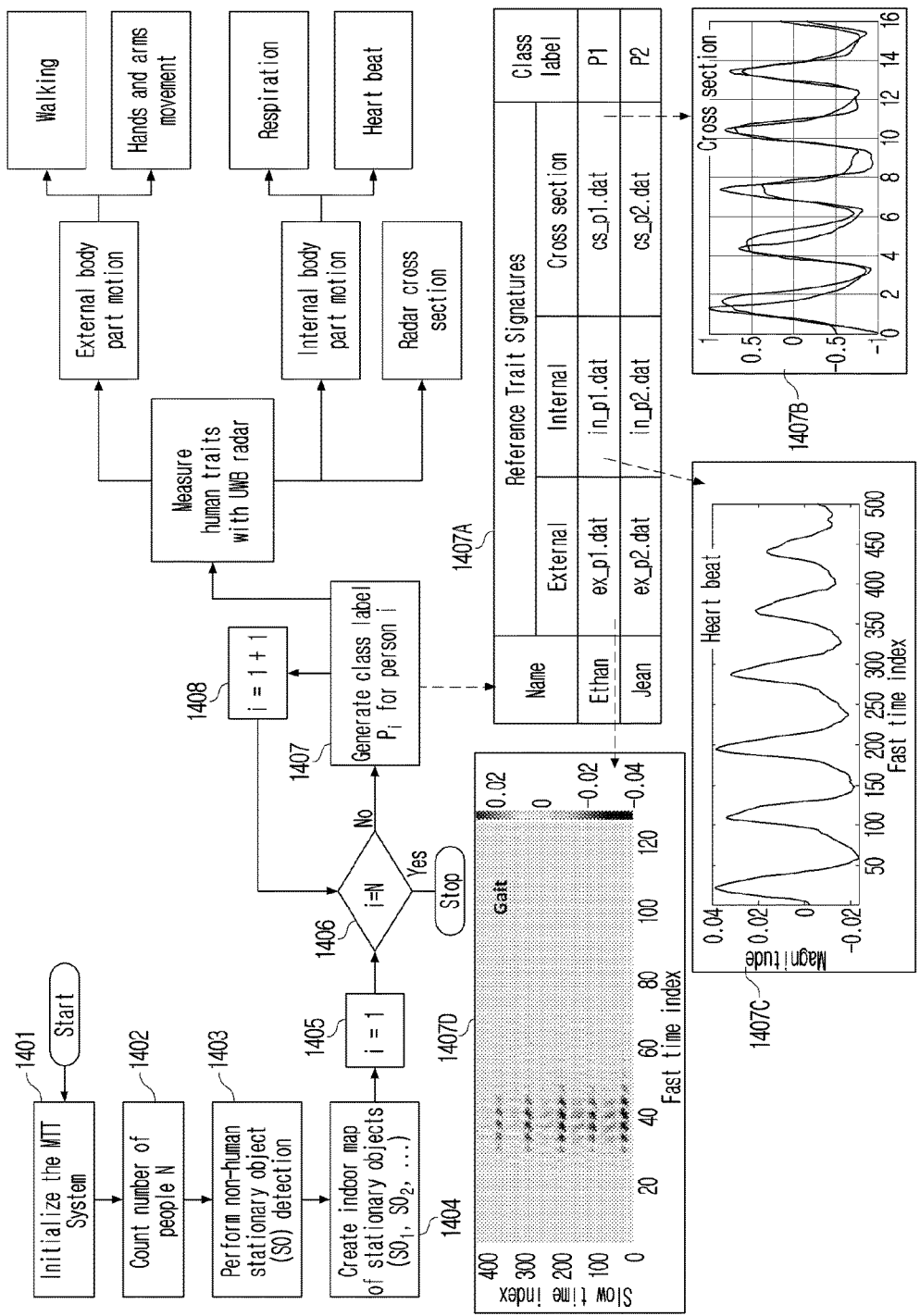
FIG. 14 is a flow diagram illustrating a method of labeling each user of the electronic device, according to an example embodiment as disclosed herein.

FIG. 14 is a flow diagram illustrating a method of labeling each user of the electronic device (100), according to an example embodiment as disclosed herein. In order to authenticate the presence of the user upon detecting the notification event, the electronic device (100) labels each user by following operations 1401-1408. At 1401, the electronic device (100) initiates a Multi-Target Tracking (MTT) of multiple targets like ghost appearance, changing of target tracks or mutual shielding among the people. The electronic device (100) uses a Multiple-Hypothesis Tracking Cluster (MHTC) hypothesis tree structure to correctly cluster incoming observations and targets-to-tracks association during a whole observation time. At 1402, the electronic device (100) counts a total number of people "N" present in the area. At 1403, the electronic device (100) detects a place, a surface type (wooden, metallic, glass etc.), a shape for each object (round, elliptic, square etc.) and non-human Stationary Object (SO) in a place using the UWB reflected signal.

The SO is identified based on stickiness of an object to a specific place. At 1404, the electronic device (100) creates the indoor map of the stationary objects (SO1, SO2 . . . ). At 1405, the electronic device (100) chooses a first person (i.e. i=1) among the people present in the location. At 1406, the electronic device (100) checks whether the chosen number of person "i" is equal to the total number of the people "N" (i.e. i=N). At 1407, when the chosen number of person "i" is not equal to the total number of the people "N", then the electronic device (100) generates class label Pi for the person "i. The electronic device (100) generates the class label for the person by measuring the human traits of the person includes an external body motion, an internal body parts motion and a cross section of body of the person. Examples of the external body motion are walking and hand and arms movements. Examples of the internal body part's motion are respiration and heartbeat.

The electronic device (100) stores the class label of the person into the memory (120) in a format as shown in table 1407A. In an example, the person named Ethan is labelled as P1, where images of the external body motion, the internal body parts motion, and the cross section of Ethan is stored as ex_p1.dat, in_p1.dat, and cs_p1.dat files respectively in the memory (120). Also, the person named Jean is labelled as P2, where images of the external body motion, the internal body parts motion, and the cross section of Jean is stored as ex_p2.dat, in_p2.dat, and cs_p2.dat files respectively in the memory (120). The images of the cross section, the heartbeat pattern, and the gait pattern of Ethan are shown in 1407B, 1407C, and 1407D. At 1408, the electronic device (100) increments the value of "i" by one value and choose a next person in the people and continues the operations 1406, 1407, 1408 till the chosen number of person "i" is equal to the total number of the people "N" (i.e. i=N).

Figure 15A:
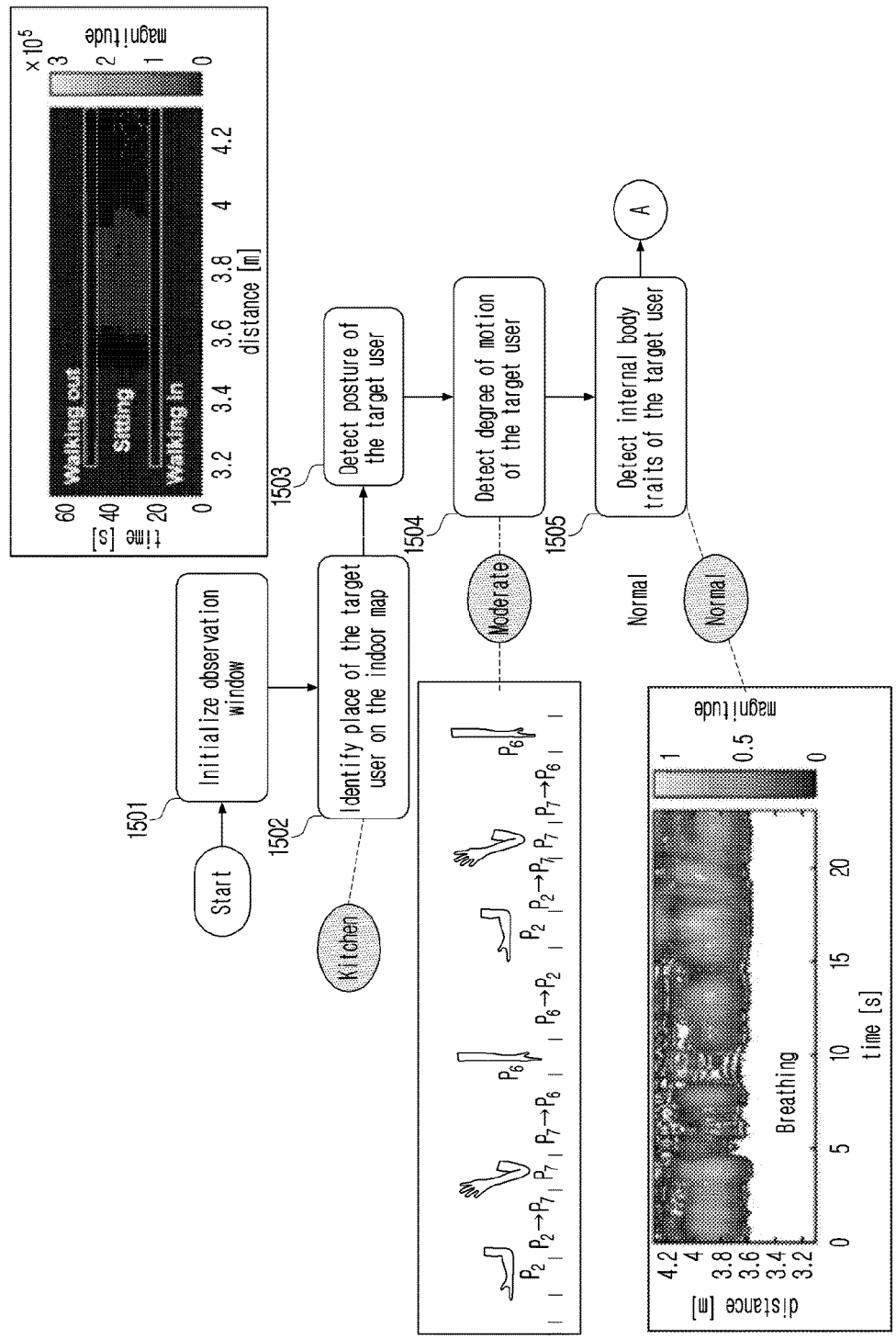
FIGS. 15A and 15B illustrate an example scenario of determining the current activity of the user, according to an example embodiment as disclosed herein.
Figure 15B:
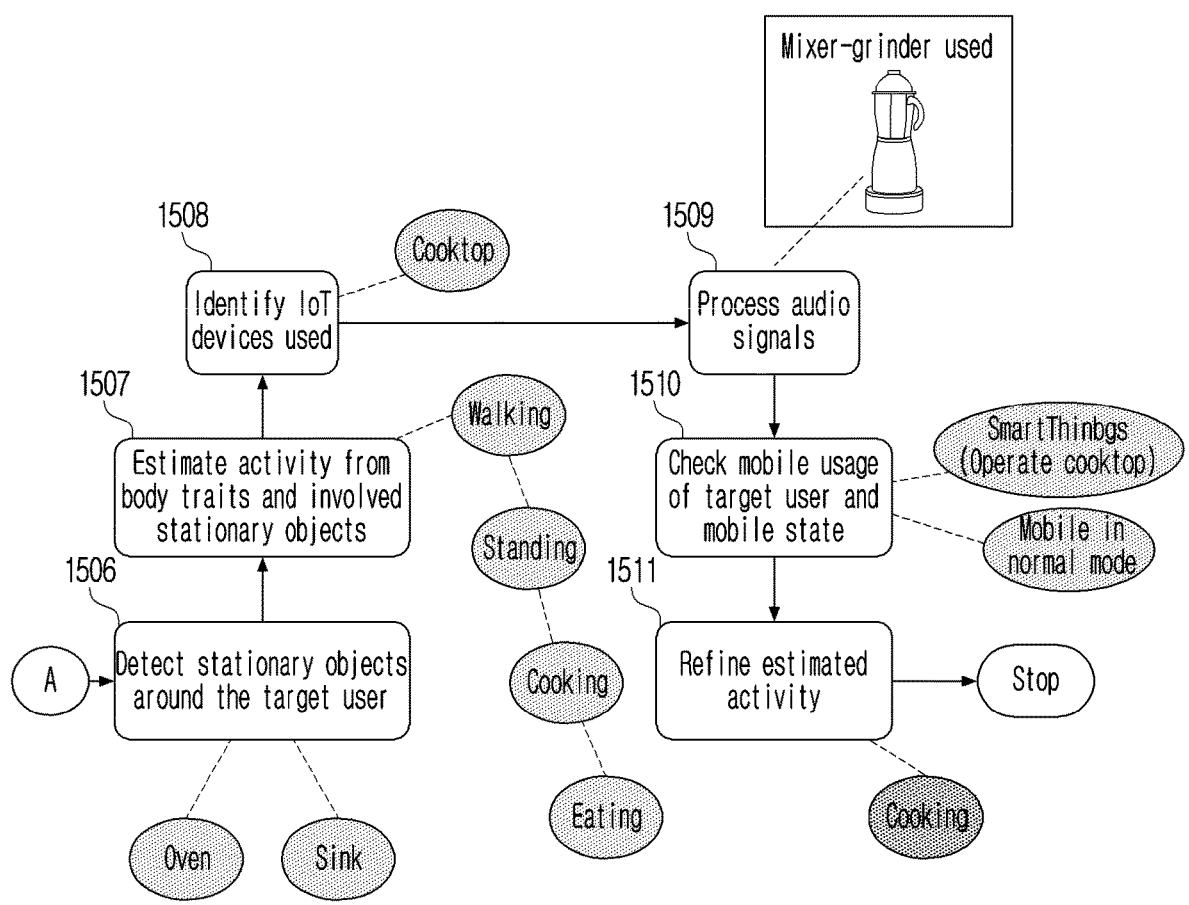

FIGS. 15A and 15B illustrate an example scenario of determining the current activity of the user, according to an example embodiment as disclosed herein. According to an example scenario, the user is cooking a food in kitchen. The electronic device (100) receives the reflected UWB signal. At 1501, the electronic device (100) initializes the observation window and monitors the reflected UWB signal. At 1502, the electronic device (100) identifies that the location of the user in the indoor map is the kitchen based on the reflected UWB signal. At 1503, the electronic device (100) detects the posture of the user based on the reflected UWB signal. At 1504, the electronic device (100) detects a degree of motion of the user as moderate. At 1505, the electronic device (100) detects the internal body traits of the user as normal based on the reflected UWB signal. Referring to FIG. 15B, at 1506, the electronic device (100) detects stationary objects such as Oven and Sink around the user based on the reflected UWB signal.

At 1507, the electronic device (100) estimates the current activity of the user based on the internal body traits and the stationary objects involved in the activity. The estimated activities are walking, standing, cooking and eating. At 1508, the electronic device (100) identifies the IoT devices used in the activity as a cooktop. At 1509, the electronic device (100) process audio signals. For example, the electronic device (100) receives and processes the ambient audio signal of the mixer grinder. At 1510, the electronic device (100) checks a usage and operational state of the smartphone of the user and detects that the smartphone is used for operating the cooktop and the smartphone is in normal mode. At 1501, the electronic device (100) refines the estimated activity and predicts the activity as cooking.

Figure 16B:
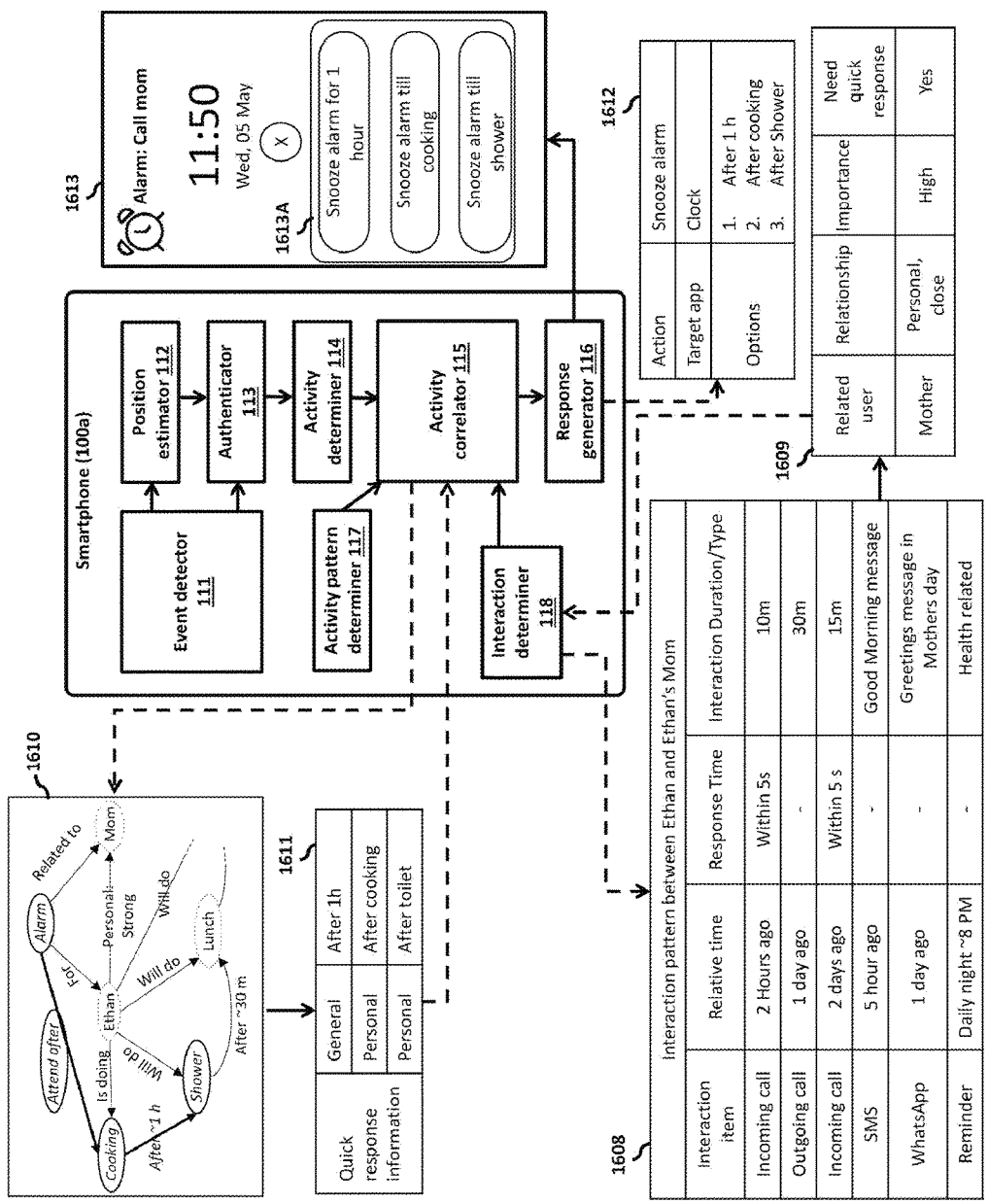

FIGS. 16A and 16B illustrate an example scenario of providing the personalized response suggestion to the user using the smartphone (100a) upon detecting the alarm event, according to an example embodiment as disclosed herein. According to the example scenario, the user named Ethan (1601A) is cooking the food in kitchen (1601). The smartphone (100a) of Ethan (1601A) is placed on the table in the kitchen (1601). The smart refrigerator (100d) is located in the kitchen (1601), where the smartphone (100a) is connected to the smart refrigerator (100d). The smartphone (100a) includes the event detector (111), the position estimator (112), the authenticator (113), the activity determiner (114), the activity correlator (115), the response generator (116), the activity pattern determiner (117), the interaction determiner (118), and the ML model (119). The smart refrigerator (100d) includes the UWB radar (150). According to the example scenario, Ethan (1601A) sets the alarm in the smartphone (100a) for reminding Ethan (1601A) to call his mom. At 1602, the alarm rings while Ethan (1601A) is busy in the kitchen (1601). At 1602A, the event detector (111) determines the information of the alarm notification as shown according to an example embodiment in Table 1 below.

TABLE 1

| | |
|---|---|
| Trigger event | Alarm |
| Trigger event type | Internal |
| Trigger device | Ethan's mobile |
| Target user | Ethan |
| Related user | Ethan's Mom |
| Relationship | Personal |
| Related action | Call |

Further, the event detector (111) receives the UWB signal data from the UWB radar (150) of the smart refrigerator (100d). At 1603, the position estimator (112) determines the location of Ethan (1601A) as the kitchen (1601) based on the UWB signal data. At 1604, the authenticator (113) authenticates the presence of Ethan (1601A) based on the UWB signal data. At 1605, in response to successfully authenticating Ethan (1601A), the activity determiner (114) determines the IoT events and related smart device used by Ethan (1601A), the non-smart devices used by Ethan (1601A)

based on the ambient sound received at the smartphone (100a), and the posture and the movements of Ethan (1601A) based on the UWB signal data as shown according to an example embodiment in Table 2 below.

TABLE 2

| Interaction item | Data Source | Target Devices |
|---|---|---|
| Smart devices used | IoT event data | Cooktop, F-Hub |
| Non-smart devices used | Sensed audio signals | Microwave oven |
| Target user posture and movement | UWB radar | Standing and moving near cooking table |

At 1606, the activity determiner (114) determines the current activity of Ethan (1601A) as cooking based on the smart device used, the non-smart devices used, and the posture and the movements. At 1607, the activity pattern determiner (117) determines the recent activity pattern of Ethan (1601A) as shown according to an example embodiment in Table 3 below.

TABLE 3

ETHAN'S RECENT ACTIVITY PATTERN

| Activity | Day of Week | Approx, start time | Approx, duration | ... |
|---|---|---|---|---|
| ... | ... | ... | ... | ... |
| Study | Weekdays | ~10:30 AM | ~1 h | ... |
| Cooking | daily | ~11:30 AM | ~1 h | ... |
| Shower | daily | ~12:30 PM | ~30 m | ... |
| ... | ... | ... | ... | ... |

Referring to FIG. 16B, at 1608, the interaction determiner (118) determines the interaction pattern between Ethan (1601A) and Ethan's mom as shown according to an example embodiment in Table 4 below.

TABLE 4

INTERACTION PATTERN BETWEEN ETHAN AND ETHAN'S MOM

| Interaction item | Relative time | Response Time | Interaction Duration/Type |
|---|---|---|---|
| Incoming call | 2 Hours ago | Within 5 s | 10 m |
| Outgoing call | 1 day ago | — | 30 m |
| Incoming call | 2 days ago | Within 5 s | 15 m |
| SMS | 5 hour ago | — | Good Morning message |
| WhatsApp | 1 day ago | — | Greetings message in Mother's Day |
| Reminder | Daily night ~8 PM | — | Health related |

At 1609, the interaction determiner (118) determines the interpretation on the interaction of Ethan (1601A) from the interaction pattern between Ethan (1601A) and Ethan's mom. The interaction determiner (118) interprets that the relationship between Ethan (1601A) and Ethan's mom is personal and close, and the importance of the notification event is high and needs the quick response. The activity correlator (115) receives the interpretation on the interaction of Ethan (1601A) and the recent activity pattern of Ethan (1601A). At 1610, the activity correlator (115) generates the correlation graph based on the interpretation on the interaction of Ethan (1601A), the recent activity pattern of Ethan (1601A), and the current activity of Ethan (1601A). At 1611, the activity correlator (115) generates the quick response information based on the correlation graph as shown according to an example embodiment in Table 5 below.

TABLE 5

| QUICK RESPONSE INFORMATION | General | After 1 h |
|---|---|---|
| | Personal | After cooking |
| | Personal | After toilet |

At 1612, the response generator (116) identifies the quick action for the notification event as snoozing the alarm, the target app for executing the action as clock app and the personalized response suggestions based on the quick response information, which are shown according to an example embodiment in Table 6 below.

TABLE 6

| Action | Snooze alarm |
|---|---|
| Target app | Clock |
| Options | After 1 h |
| | After cooking |
| | After Shower |

At 1613, the response generator (116) displays the personalized response suggestions (1613A) along with the alarm notification on the display of the smartphone (100a).

Figure 17A:
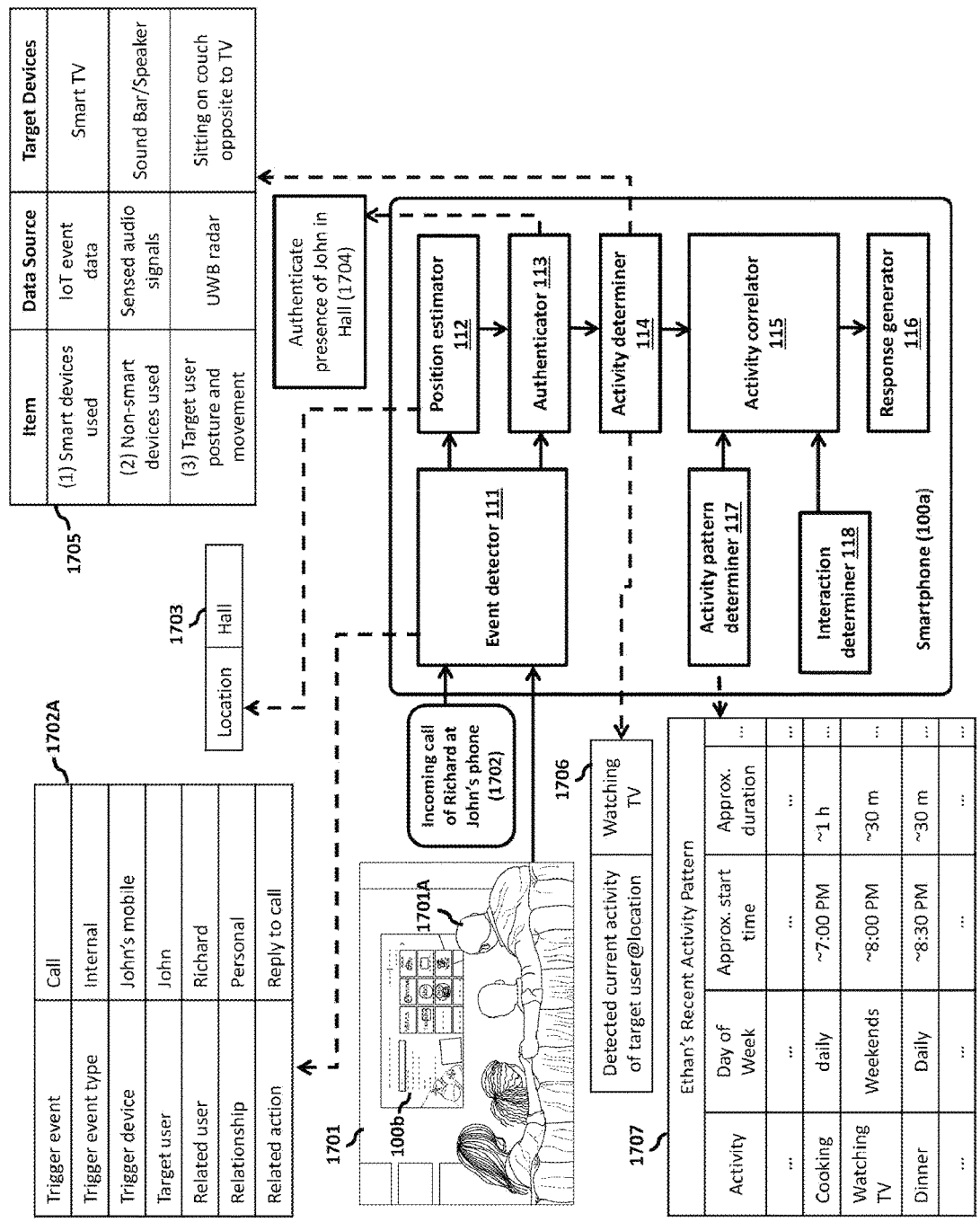
FIGS. 17A and 17B illustrate an example scenario of providing the personalized response suggestion to the user using the smartphone upon detecting an incoming call event, according to an example embodiment as disclosed herein.
Figure 17B:
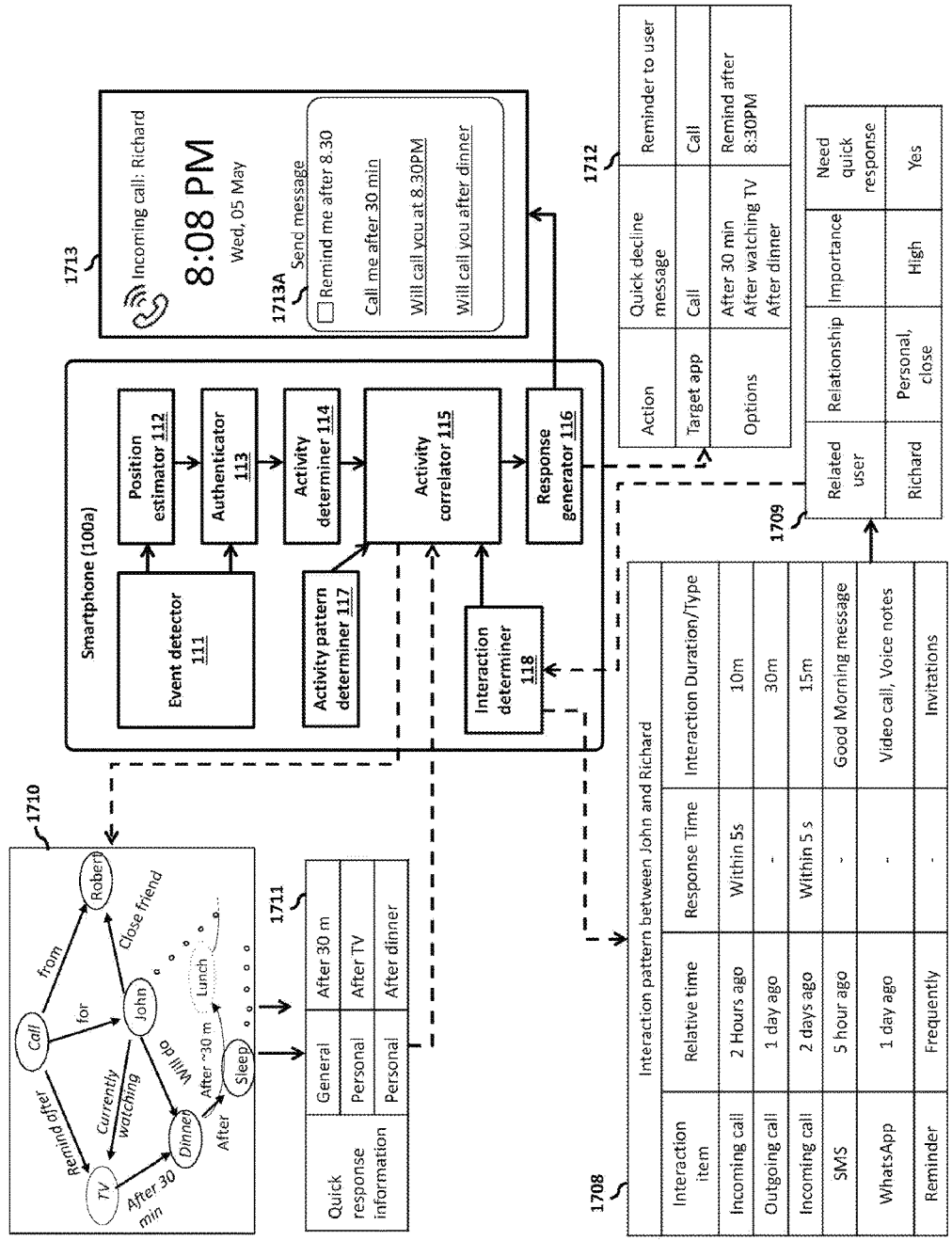

FIGS. 17A and 17B illustrate an example scenario of providing the personalized response suggestion to the user using the smartphone (100a) upon detecting an incoming call event, according to an example embodiment as disclosed herein. Consider, the user named John (1701A) is watching the smart TV (100b) in a hall (1701). The smartphone (100a) of John (1701A) is placed on the table in the hall (1701). The smartphone (100a) is connected to the smart TV (100b). The smart TV (100b) includes the UWB radar (150). At 1702, the smartphone (100a) receives the call from his friend Richard while John (1701A) is busy in watching the smart TV (100b). At 1702A, the event detector (111) determines the information of the incoming call notification as given in the table 7.

TABLE 7

| Trigger event | Call |
|---|---|
| Trigger event type | Internal |
| Trigger device | John's mobile |
| Target user | John |
| Related user | Richard |
| Relationship | Personal |
| Related action | Reply to call |

Further, the event detector (111) receives the UWB signal data from the UWB radar (150) of the smart TV (100b). At 1703, the position estimator (112) determines the location of John (1701A) as the hall (1701) based on the UWB signal data. At 1704, the authenticator (113) authenticates the presence of John (1701A) based on the UWB signal data. At 1705, in response to successfully authenticating John (1701A), the activity determiner (114) determines the IoT events and related smart device used by John (1701A), the non-smart devices used by John (1701A) based on the ambient sound received at the smartphone (100a), and the posture and the movements of John (1701A) based on the UWB signal data as shown according to an example embodiment in Table 8 below.

TABLE 8

| Interaction item | Data Source | Target Devices |
|---|---|---|
| Smart devices used | IoT event data | Smart TV |
| Non-smart devices used | Sensed audio signals | Sound Bar/Speaker |
| Target user posture and movement | UWB radar | Sitting on couch opposite to TV |

At 1706, the activity determiner (114) determines the current activity of John (1701A) as watching the smart TV (100b) based on the smart device used, the non-smart devices used, and the posture and the movements. At 1707, the activity pattern determiner (117) determines the recent activity pattern of John (1701A) as shown according to an example embodiment in Table 9 below.

TABLE 9

JOHN'S RECENT ACTIVITY PATTERN

| Activity | Day of Week | Approx. start time | Approx. duration | ... |
|---|---|---|---|---|
| ... | ... | ... | ... | ... |
| Cooking | daily | ~7:00 PM | ~1 h | ... |
| Watching TV | Weekends | ~8:00 PM | ~30 m | ... |
| Dinner | Daily | ~8:30 PM | ~30 m | ... |
| ... | ... | ... | ... | ... |

Referring to FIG. 17B, at 1708, the interaction determiner (118) determines the interaction pattern between John (1701A) and Richard as shown according to an example embodiment in Table 10 below.

TABLE 10

INTERACTION PATTERN BETWEEN JOHN AND RICHARD

| Interaction item | Relative time | Response Time | Interaction Duration/Type |
|---|---|---|---|
| Incoming call | 2 Hours ago | Within 5 s | 10 m |
| Outgoing call | 1 day ago | — | 30 m |
| Incoming call | 2 days ago | Within 5 s | 15 m |
| SMS | 5 hour ago | — | Good Morning message |
| WhatsApp | 1 day ago | — | Video call, Voice notes |
| Reminder | Frequently | — | Invitations |

At 1709, the interaction determiner (118) determines the interpretation on the interaction of John (1701A) from the interaction pattern between John and Richard. The interaction determiner (118) interprets that the relationship between John and Richard is personal and close, and the importance of the notification event is high and needs the quick response. The activity correlator (115) receives the interpretation on the interaction of John (1701A) and the recent activity pattern of John (1701A). At 1710, the activity correlator (115) generates the correlation graph based on the interpretation on the interaction of John (1701A), the recent activity pattern of John (1701A), and the current activity of John (1701A). At 1711, the activity correlator (115) generates the quick response information based on the correlation graph as shown according to an example embodiment in Table 11 below.

TABLE 11

| QUICK RESPONSE INFORMATION | General Personal Personal | After 30 m After TV After dinner |
|---|---|---|

At 1712, the response generator (116) identifies the quick action for the notification event, the target app for executing the action and the personalized response suggestions based on the quick response information, which are shown according to an example embodiment in Table 12 below.

TABLE 12

| Action | Quick decline message | Reminder to user |
|---|---|---|
| Target app Options | Call After 30 min After watching TV After dinner | Call Remind after 8:30 PM |

At 1713, the response generator (116) displays the personalized response suggestions (1713A) along with the incoming call notification on the display of the smartphone (100a).

Figure 18A:
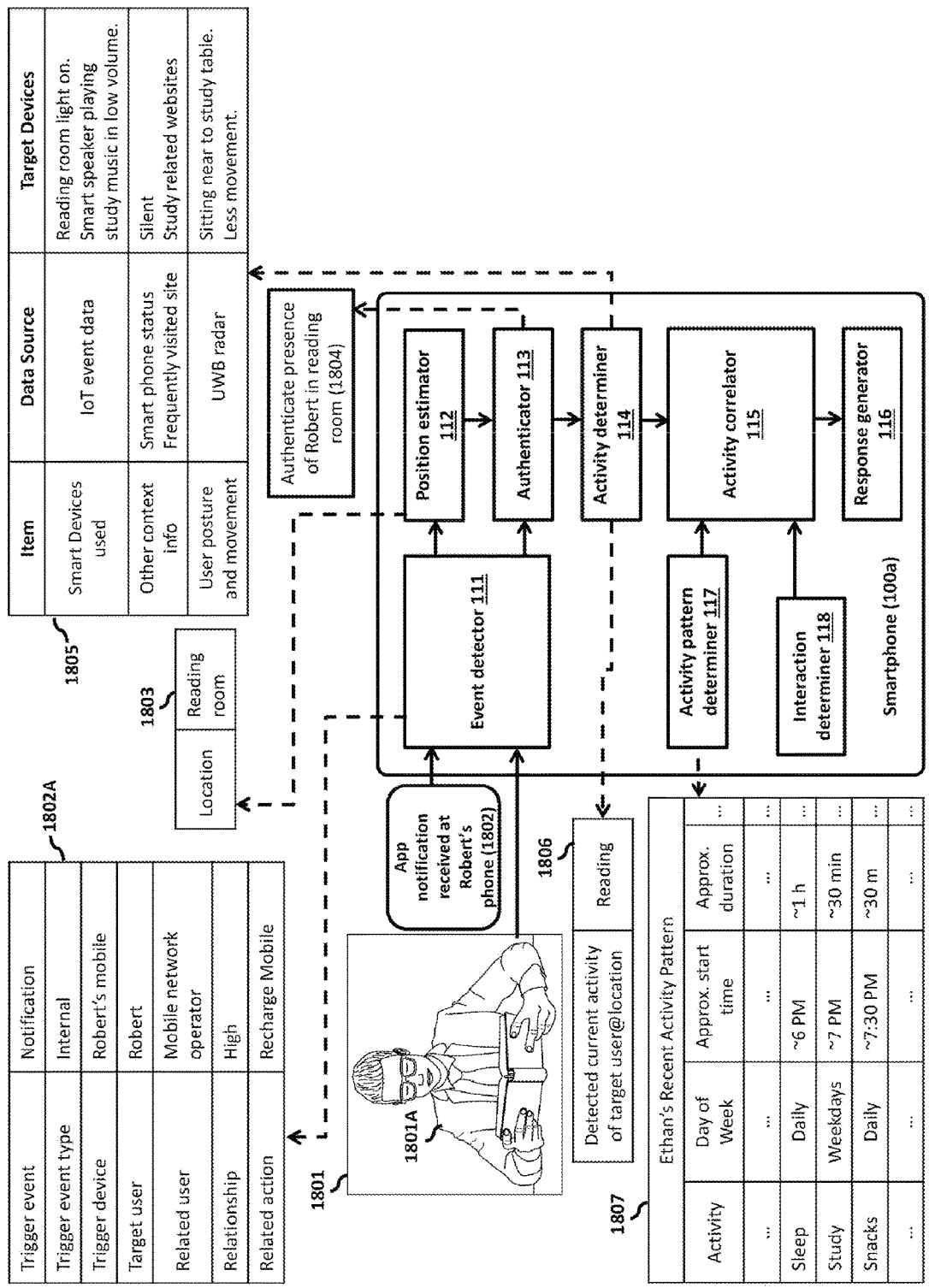
FIGS. 18A and 18B illustrate an example scenario of providing the personalized response suggestion to the user using the smartphone upon detecting an application notification, according to an example embodiment as disclosed herein.
Figure 18B:
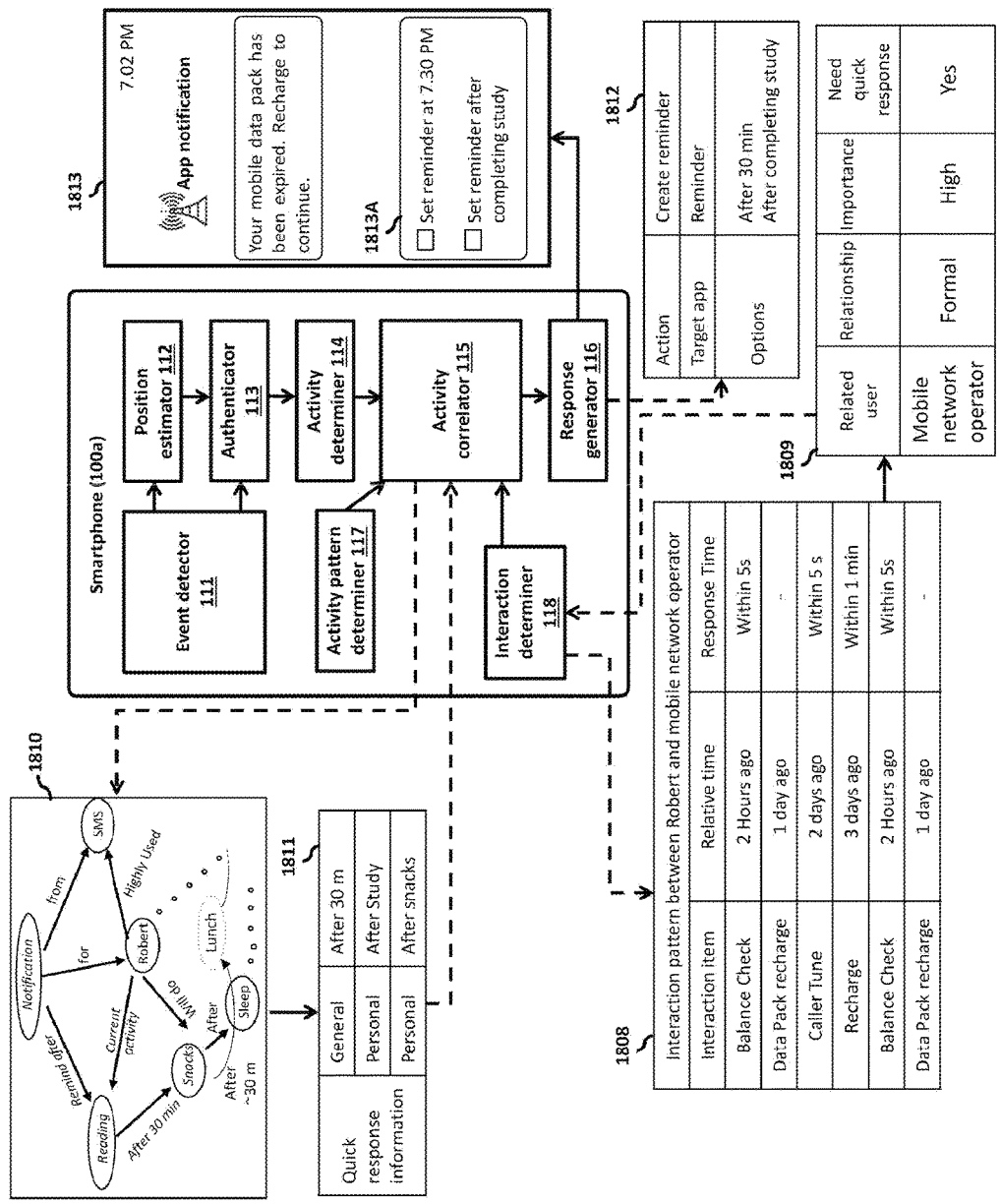

FIGS. 18A and 18B illustrate an example scenario of providing the personalized response suggestion to the user using the smartphone (100a) upon detecting an application notification, according to an example embodiment as disclosed herein. Consider, the user named Robert (1801A) is reading a book in a reading room (1801). The smartphone (100a) of Robert (1801A) is placed on the table of the reading room (1801). The smartphone (100a) includes the event detector (111), the position estimator (112), the authenticator (113), the activity determiner (114), the activity correlator (115), the response generator (116), the activity pattern determiner (117), the interaction determiner (118), the UWB radar (150), and the ML model (119). At 1802, the smartphone (100a) receives an app notification from a mobile network operator while Robert (1801A) is busy in reading the book. At 1802A, the event detector (111) determines the information of the app notification as shown according to an example embodiment in Table 13 below.

TABLE 13

| Trigger event | Notification |
|---|---|
| Trigger event type | Internal |
| Trigger device | Robert's mobile |
| Target user | Robert |
| Related user | Mobile network operator |
| Relationship | High |
| Related action | Recharge Mobile |

Further, the event detector (111) receives the UWB signal data using the UWB radar (150). At 1803, the position estimator (112) determines the location of Robert (1801A) as the reading room (1801) based on the UWB signal data. At 1804, the authenticator (113) authenticates the presence of Robert (1801A) based on the UWB signal data. At 1805, in response to successfully authenticating Robert (1801A), the activity determiner (114) determines the IoT events and related smart device used by Robert (1801A), the context information of smartphone (100a) and the posture and the movements of Robert (1801A) based on the UWB signal data as shown according to an example embodiment in Table 14 below.

TABLE 14

| Interaction item | Data Source | Target Devices |
|---|---|---|
| Smart Devices used | IoT event data | Reading room light on. Smart speaker playing study music in low volume. |
| Context info | Smart phone status | Silent |
| | Frequently visited site | Study related websites |
| User posture and movement | UWB radar | Sitting near to study table. Less movement. |

At 1806, the activity determiner (114) determines the current activity of Robert (1801A) as reading based on the smart device used, the context info, and the posture and the movements. At 1807, the activity pattern determiner (117) determines the recent activity pattern of Robert (1801A) as shown according to an example embodiment in Table 15 below.

TABLE 15

ROBERT'S RECENT ACTIVITY PATTERN

| Activity | Day of Week | Approx. start time | Approx. duration | |
|---|---|---|---|---|
| ... | ... | ... | ... | ... |
| Sleep | Daily | ~6 PM | ~1 h | ... |
| Study | Weekdays | ~7 PM | ~30 min | ... |
| Snacks | Daily | ~7:30 PM | ~30 m | ... |
| ... | ... | ... | ... | ... |

Referring to FIG. 18B, at 1808, the interaction determiner (118) determines the interaction pattern between Robert (1801A) and the mobile network operator as shown according to an example embodiment in Table 16 below.

TABLE 16

INTERACTION PATTERN BETWEEN ROBERT AND MOBILE NETWORK OPERATOR

| Interaction item | Relative time | Response Time |
|---|---|---|
| Balance Check | 2 Hours ago | Within 5 s |
| Data Pack recharge | 1 day ago | — |
| Caller Tune | 2 days ago | Within 5 s |
| Recharge | 3 days ago | Within 1 min |
| Balance Check | 2 Hours ago | Within 5 s |
| Data Pack recharge | 1 day ago | — |

At 1809, the interaction determiner (118) determines the interpretation on the interaction of Robert (1801A) from the interaction pattern between Robert (1801A) and the mobile network operator. The interaction determiner (118) interprets that the relationship between Robert (1801A) and the mobile network operator is formal, and the importance of the notification event is high and needs the quick response. The activity correlator (115) receives the interpretation on the interaction of Robert (1801A) and the recent activity pattern of Robert (1801A). At 1810, the activity correlator (115) generates the correlation graph based on the interpretation on the interaction of Robert (1801A), the recent activity pattern of Robert (1801A), and the current activity of Robert (1801A). At 1811, the activity correlator (115) generates the quick response information based on the correlation graph as shown according to an example embodiment in Table 17 below.

TABLE 17

| Quick response information | General | After 30 m |
|---|---|---|
| | Personal | After Study |
| | Personal | After snacks |

At 1812, the response generator (116) identifies the quick action for the notification event, the target app for executing the action and the personalized response suggestions based on the quick response information, which are shown according to an example embodiment in Table 18 below.

TABLE 18

| Action | Create reminder |
|---|---|
| Target app | Reminder |
| Options | After 30 min |
| | After completing study |

At 1813, the response generator (116) displays the personalized response suggestions (1813A) along with the app notification on the display of the smartphone (100a).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A method of providing personalized response suggestions to a notification event using an electronic device, the method comprising:
    detecting, by the electronic device, the notification event associated with a user;
    identifying, by the electronic device, a presence of the user for the notification event based on Ultra-Wide Band (UWB) signal data obtained from at least one of the electronic device or one or more Internet of Things (IoT) devices;
    receiving, by the electronic device, IoT events from at least one of the electronic device or the one or more IoT devices;
    determining, by the electronic device, a current activity of the user based on the UWB signal data input as a first input into at least one Machine Learning (ML) model and the IoT events input as a second input into the at least one Machine Learning (ML) model;
    correlating, by the electronic device, the current activity with a plurality of previous activities performed by the user and a past interaction pattern of the user in connection with previous notification events; and
    generating, by the electronic device, one or more auto response suggestions for the notification event based on a result of the correlation.

2. The method as claimed in claim 1, wherein the identifying the presence of the user for the notification event based on the UWB signal data obtained from at least one of the electronic device or the one or more IoT devices, comprises:
  receiving, by the electronic device, the UWB signal data from a UWB radar of at least one of the electronic device or the one or more IoT devices;
  determining, by the electronic device, one or more physical or physiological parameter of the user based on the UWB signal data;
  authenticating, by the electronic device, the user based on the one or more physical or physiological parameter using the at least one ML model;
  determining, by the electronic device, a position of the user based on the UWB signal data using the at least one ML model, in response to successfully authenticating the user;
  identifying, by the electronic device, that the user is in proximity of the electronic device based on the position of the user; and
  determining, by the electronic device, that the user is available for notifying the notification event.

3. The method as claimed in claim 2, wherein the one or more physical or physiological parameter comprises a breathing pattern, a heartbeat pattern, and a body cross section profile.

4. The method as claimed in claim 2, wherein the determining the position of the user based on the UWB signal data using the at least one ML model, comprises:
  determining, by the electronic device, UWB signal parameters comprising a Reflected Signal Strength (RSS), a Time difference of Arrival (TDOA), a Time of Arrival (TOA), and an Angle of Arrival (AOA) from the UWB signal data; and
  identifying, by the electronic device, the position of the user based on the UWB signal parameters using the at least one ML model.

5. The method as claimed in claim 2, wherein the at least one ML model is trained for identifying the user based on the one or more physical or physiological parameter by:
  providing, by the electronic device, a dataset of physical and physiological parameters of a plurality of users to the at least one ML model;
  providing, by the electronic device, the one or more physical or physiological parameter of the user to the at least one ML model, based on detecting the notification event associated with the user; and
  training, by the electronic device, the at least one ML model to identify the user by correlating the one or more physical or physiological parameter of the user with the dataset of physical and physiological parameters of the plurality of users.

6. The method as claimed in claim 2, wherein the at least one ML model is trained for identifying the position of the user by:
  generating, by the electronic device, a first virtual map of an area using UWB signal data generated when no user is present in the area;
  providing, by the electronic device, the first virtual map of the area to the at least one ML model;
  generating, by the electronic device, a second virtual map of the area using UWB signal data generated when at least one user is present in the area;
  providing, by the electronic device, the second virtual map of the area to the at least one ML model; and
  training, by the electronic device, the at least one ML model to identify the position of the at least one user in the area by correlating the second virtual map with the first virtual map.

7. The method as claimed in claim 1, wherein the determining the current activity of the user based on the UWB signal data input as the first input into the at least one Machine Learning (ML) model and the IoT events input as the second input into the at least one ML model, comprises:
  receiving, by the electronic device, an ambient sound around the electronic device;
  determining, by the electronic device, at least one of a posture or a movement of the user based on the UWB signal data; and
  determining, by the electronic device, the current activity of the user based on the at least one of the posture or the movement of the user, the ambient sound, and the IoT events using the at least one ML model.

8. The method as claimed in claim 7, wherein the at least one ML model is trained for determining the current activity of the user based on the posture and the movements of the user, the ambient sound, and the IoT events by:
  providing, by the electronic device, a dataset of a plurality of posture and movements of a human body corresponding to a plurality of activities, a plurality of ambient sounds, and a plurality of IoT events to the at least one ML model; and
  training, by the electronic device, the at least one ML model to identify a specific activity corresponding to a particular posture and movement, among the posture and movements, a particular ambient sound, among the plurality of ambient sounds, and a particular IT event, among the plurality of IoT events.

9. The method as claimed in claim 1, wherein the electronic device is one of a smartphone, a laptop, a tablet computer, a Personal Digital Assistance (PDA), a desktop computer, an Internet of Thing (IoT) device, or a wearable device.

10. The method as claimed in claim 1, wherein the electronic device is located in proximity of the user and is capable of providing the one or more auto response suggestions for the notification event.

11. The method as claimed in claim 1, wherein the generating the one or more auto response suggestions for the notification event further comprises:
  determining proximity of the user to the electronic device based on the UWB signal data; and
  generating the one or more auto response suggestions for the notification event based on the proximity of the user to the electronic device.

12. The method as claimed in claim 1, wherein the generating the one or more auto response suggestions for the notification event further comprises:
  determining, based on an interaction history of the user, an importance level of at least one of the current activity and a plurality of activities subsequent to the current activity; and
  generating the one or more auto response suggestions for the notification event based on the importance level of at least one of the current activity and the plurality of activities subsequent to the current activity.

13. An electronic device comprising:
  a memory storing one or more instructions;
  a processor configured to execute the one or more instructions to:
    detect a notification event associated with a user, identify a presence of the user for the notification event based on Ultra-Wide Band (UWB) signal data obtained from at least one of the electronic device or one or more Internet of Things (IoT) devices, receive IoT events from at least one of the electronic device or the one or more IoT devices;

determine a current activity of the user based on the UWB signal data input as a first input into at least one Machine Learning (ML) model and the IoT events input as a second input into the at least one Machine Learning (ML) model, determine an importance level of at least one of the current activity and a plurality of subsequent activities from an interaction history of the user, generate at least one personalized response to the notification event based on the importance level of the at least one of the current activity and the plurality of subsequent activities, and provide the at least one personalized response to the user.

14. The electronic device as claimed in claim 13, wherein the processor is further configured to identify the presence of the user by:

receiving the UWB signal data from a UWB radar of at least one of the electronic device or the one or more IoT devices;

determining one or more physical or physiological parameter based on the UWB signal data;

authenticating the user based on the one or more physical or physiological parameter using the at least one ML model;

determining a position of the user based on the UWB signal data using the at least one ML model, based on successfully authenticating the user;

identifying that the user is in proximity of the electronic device based on the position of the user; and determining that the user is available for notifying the notification event.

15. The electronic device as claimed in claim 14, wherein the one or more physical or physiological parameter comprises a breathing pattern, a heartbeat pattern, and a body cross section profile.

16. The electronic device as claimed in claim 13, wherein the processor is further configured to determine the current activity of the user based on the UWB signal data input as the first input into the at least one Machine Learning (ML) model and the IoT events input as the second input into the at least one ML model by:

receiving an ambient sound around the electronic device;

determining at least one of a posture and a movement of the user based on the UWB signal data; and determining the current activity of the user based on the at least one of the posture and the movement of the user, the ambient sound, and the IoT events using the at least one ML model.

17. The electronic device as claimed in claim 13, wherein the processor is further configured to determine the importance level of the at least one of the current activity and the plurality of subsequent activities from the interaction history of the user by:

determining that the notification event is important to notify the user based on an interaction pattern of the user in the interaction history;

searching for an activity being performed by the user as per a routine from a recent activity pattern of the user in the interaction history at a time of detecting the notification event;

identifying the activity being performed by the user as per the routine from the recent activity pattern at the time of detecting the notification event;

determining that the identified activity and the determined current activity of the user are same; and determining the importance level of at least one of the identified activity and the plurality of subsequent activities listed in the recent activity pattern.

18. The electronic device of claim 13, wherein the processor is further configured to:

determine proximity of the user to the electronic device based on the UWB signal data; and provide the at least one personalized response to the user based on the proximity of the user to the electronic device.

19. The electronic device of claim 13, wherein the processor is further configured to:

correlate the current activity with a plurality of previous activities performed by the user and a past interaction pattern of the user in connection with previous notification events; and provide the at least one personalized response to the user based on a result of the correlation.

\* \* \* \* \*